(12) United States Patent
Nan et al.

(10) Patent No.: US 9,584,254 B2
(45) Date of Patent: Feb. 28, 2017

(54) DATA TRANSMISSION METHOD AND DEVICE FOR REDUCING LOSS OF INFORMATION BITS

(71) Applicant: Huawei Technologies Co., Ltd., Shenzhen (CN)

(72) Inventors: Fang Nan, Shenzhen (CN); Qiang Wu, Shenzhen (CN); Xiaoan Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/537,274

(22) Filed: Nov. 10, 2014

(65) Prior Publication Data

US 2015/0063280 A1     Mar. 5, 2015

Related U.S. Application Data

(63) Continuation of application No. PCT/CN2012/079265, filed on Jul. 27, 2012.

(30) Foreign Application Priority Data

May 11, 2012   (WO) ................ PCT/CN2012/075388

(51) Int. Cl.
    *H04L 1/00*      (2006.01)
    *H04L 1/18*      (2006.01)
(52) U.S. Cl.
    CPC .......... *H04L 1/0006* (2013.01); *H04L 1/0007* (2013.01); *H04L 1/0013* (2013.01);
    (Continued)
(58) Field of Classification Search
    CPC ... H04L 1/0006; H04L 1/0007; H04L 1/0025; H04L 1/0013; H04L 1/0058; H04L 1/0071; H04L 1/1819
    See application file for complete search history.

(56) References Cited

U.S. PATENT DOCUMENTS

2009/0257408 A1   10/2009  Zhang et al.
2010/0058136 A1*  3/2010   Lee ................... H03M 13/2957
                                                   714/748

(Continued)

FOREIGN PATENT DOCUMENTS

CN         1852073 A       10/2006
CN       101277177 A       10/2008
(Continued)

OTHER PUBLICATIONS

"$3^{rd}$ Generation Partnership Project; Technical Specification Group Radio Access Network; Evolved Universal Terrestrial Radio Access (E-UTRA); Physical Layer Procedures (Release 10)," Global System for Mobile Communications, 3GPP TS 36.213, V10.5.0, Mar. 2012, 125 pages.

(Continued)

*Primary Examiner* — Jackie Zuniga Abad
(74) *Attorney, Agent, or Firm* — Brinks Gilson & Lione

(57) ABSTRACT

The present invention provides a method and a device for data transmission. The method includes: according to a preconfigured second table, selecting a TBS value, where the second table is used for describing a corresponding relationship among a TBS value, the number of RBs and a TBS index, the number of RBs corresponding to the selected TBS value is smaller than or equal to a specific value, a modulation mode corresponding to a TBS index which corresponds to the selected TBS value is QPSK, and the selected TBS value is capable of satisfying the rate requirement required during transmission time interval TTI bundling transmission; and according to the selected TBS value, transmitting data carried by a PUSCH using bundled TTIs. The embodiments of the present invention can improve the coverage at a PUSCH medium data rate.

18 Claims, 7 Drawing Sheets

(52) U.S. Cl.
CPC .......... *H04L 1/0025* (2013.01); *H04L 1/0058* (2013.01); *H04L 1/1819* (2013.01); *H04L 1/0067* (2013.01); *H04L 1/0071* (2013.01)

(56) References Cited

U.S. PATENT DOCUMENTS

2010/0195614 A1  8/2010  Nimbalker et al.
2014/0038665 A1  2/2014  Lin et al.

FOREIGN PATENT DOCUMENTS

| CN | 101567774 A | 10/2009 |
| CN | 101640579 A | 2/2010 |
| CN | 102255710 A | 11/2011 |

OTHER PUBLICATIONS

ZTE, "Discussion of Potential Schemes for Uplink Coverage Enhancement," TSG-RAN WG1 #68, Dresden, Germany, R1-120614, 2012, 4 pages.

Lte Advanced, "3$^{rd}$ Generation Partnership Project; Technical Specification Group Radio Access Network; Evolved Universal Terrestrial Radio Access (E-UTRA); Multiplexing and Channel coding" (Release 10) 3GPP TS 36.212, V. 10.5.0, Mar. 2012, 79 pages.

* cited by examiner

"PRIOR ART"

"PRIOR ART"

"PRIOR ART"

"PRIOR ART"

"PRIOR ART"

DATA TRANSMISSION METHOD AND DEVICE FOR REDUCING LOSS OF INFORMATION BITS

CROSS-REFERENCE TO RELATED APPLICATIONS

This application is a continuation of International Application No. PCT/CN2012/079265, filed on Jul. 27, 2012, which claims priority to International Application No. PCT/CN2012/075388, filed on May 11, 2012, both of which are hereby incorporated by reference in their entireties.

TECHNICAL FIELD

The present invention relates to wireless communication technologies and, in particular, to a method and a device for data transmission.

BACKGROUND

In order to save costs and make network deployment more conveniently, operators hope that a long term evolution (LTE) could use a same site as an existing universal mobile telecommunication system (UMTS), and in order to guarantee the communication quality of a cell edge user, it is required that the LTE could achieve a same coverage as the UMTS system. The LTE divides different channels over a physical layer to carry different information, it is required to evaluate a coverage of each channel of the LTE, identify a coverage-limited channel, and finally consider a method capable of enhancing the coverage of the channel.

It is possible to evaluate the coverage of each channel of the LTE according to a maximum coupling loss (MCL) value, the smaller the MCL value, it indicates that the smaller the coverage of a corresponding channel. A physical uplink shared channel (PUSCH) is used to transmit uplink data services, when the PUSCH is used for data service transmission at a medium rate (hereinafter referred to as a PUSCH medium data rate), its MCL value is the smallest compared with MCL values of other channels, the coverage is the worst, and its coverage is required to be improved. Where, the PUSCH medium data rate refers to a rate between 128 kbps and 384 kbps generally.

In order to improve the coverage, a transmission time interval (TTI) bundling (TTI bundling) method can be used, the TTI bundling in the prior art can only be applied in a scenario of a quadrature phase shift keying (QPSK) modulation with the number of resource blocks (RB) being less than or equal to 3. In this scenario, the maximum value of a transport block size (TBS) is 504 bits. Then, even if initial transmission is 100% correct at this time, when four subframes are bundled, the maximum data rate is only 5044 ms=126 kbps, whereas the PUSCH medium data rate is in the range of 128 kbps to 384 kbps generally, the rate requirement for the PUSCH medium data rate cannot be achieved after using the TTI bundling. That is to say, the existing TTI bundling scheme cannot be applied in the scenario of the PUSCH medium data rate directly, a solution to improve the coverage at the PUSCH medium data rate requires to be considered.

SUMMARY

The present invention provides a method and a device for data transmission, so as to improve coverage at a PUSCH medium data rate.

In one aspect, the present invention provides a method for data transmission, including:

selecting a transport block size TBS value according to a preconfigured second table, where the second table is used for describing the corresponding relationship among a TBS value, the number of resource blocks RBs and a TBS index, the number of RBs corresponding to the selected TBS value is smaller than or equal to a specific value, a modulation mode corresponding to a TBS index which corresponds to the selected TBS value is quadrature phase shift keying QPSK, and the selected TBS value is capable of satisfying a rate requirement required during transmission time interval TTI bundling transmission;

transmitting data using bundled TTIs according to the selected TBS value, wherein the data carried by a physical uplink shared channel PUSCH.

In a possible implementation, the transmitting the data carried by the PUSCH using the bundled TTIs according to the selected TBS value includes:

selecting the data carried by the PUSCH, where the data carried by the PUSCH including all or part of information bits, the number of the information bits is the selected TBS value, when selecting the data carried by the PUSCH, starting to select data within a storage location range of the information bits, and successively selecting all information bits starting from a selection starting point; and transmitting the selected data carried by the PUSCH using the bundled TTIs.

In another possible implementation, the selecting the data carried by the PUSCH includes:

successively and circularly selecting data that can be transmitted by the bundled TTIs.

In another possible implementation, the selection starting point is: a position indicated by RV0.

In another possible implementation, the transmitting the data carried by the PUSCH includes:

during an initial transmission, transmitting consecutive data that starts to be selected from the position indicated by the RV0.

In another possible implementation, the TBS value, the number of the RBs and the TBS index described by the second table meet at least one of following:

in the second table, when the number of the RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value is capable of satisfying the rate requirement required during the TTI bundling transmission; or, in the second table, when the number of the RBs is smaller than or equal to a specific value and the TBS value is capable of satisfying the rate requirement required during the TTI bundling transmission, the modulation mode corresponding to a corresponding TBS index is obtained after amending a modulation mode corresponding to a TBS index which corresponds to the same number of RBs and the same TBS value in the first table, such that the amended modulation mode is QPSK; or, in the second table, when the modulation mode corresponding to a TBS index is QPSK and the TBS value is capable of satisfying the rate requirement required during the TTI bundling transmission, the corresponding number of RBs is greater than a maximum value of the number of RBs that can be selected in the first table during the TTI bundling transmission;

where, the first table is an existing table used for describing the corresponding relationship among the TBS value, the number of the RBs and the TBS index.

In another possible implementation, the selected TBS value is any one of values within a range of [568,2152] and included in the first table.

In another possible implementation, the specific value is 8.

In another possible implementation, the data carried by the PUSCH is rate matching output data for each code block, and the selecting data carried by the PUSCH includes:

determining the number of data that can be transmitted by the bundled TTIs, and determining a rate matching output sequence length according to the number of the data that can be transmitted by the bundled TTIs;

determining a starting position for data selection according to a unique redundancy version number;

in a buffer for buffering a data stream after subblock interleaving, starting to successively and circularly select data whose length is the rate matching output sequence length from the starting position for the data selection, obtaining the rate matching output data for each code block, where the data stream after the subblock interleaving is a data stream obtained after performing the subblock interleaving to a codestream that is obtained after performing CRC addition, code block segmentation, code block CRC addition and coding to the information bits;

the transmitting the selected data carried by the PUSCH using the bundled TTIs includes:

performing code block cascading to the rate matching output data for each code block;

performing modulation to the code block-cascaded data, and transmitting modulated symbols within each TTI of the bundled TTIs respectively.

In another possible implementation, during an initial transmission, the unique redundancy version number is 0; or, during a retransmission, the unique redundancy version number is 0, 1, 2 or 3.

In another possible implementation, the determining the number of the data that can be transmitted by the bundled TTIs includes: determining the number of the data that can be transmitted by the bundled TTIs according to $H=G \times N$, where H is the number of the data that can be transmitted by the bundled TTIs;

G is the total number of data available for transmission of a transport block within a TTI;

N is the number of TTIs in a bundle.

In another possible implementation, the determining the rate matching output sequence length according to the number of the data that can be transmitted by the bundled TTIs includes: determining the rate matching output sequence length according to a following computation formula:

if $r \le C-\gamma-1$, then $E_r'=N_L \times Q_m \times \lfloor G'/C \rfloor$, otherwise,
$E_r'=N_L \times Q_m \times \lceil G'/C \rceil$;

where, $E_r'$ is the rate matching output sequence length;
r is a code block number; C is the number of code blocks obtained during code block segmentation; $\lfloor \ \rfloor$ indicates rounding down, $\lceil \ \rceil$ indicates rounding up;
$\gamma=G'$ mod C, where the mod indicates modulo operation;
$G'=H/(N_L \times Q_m)$, where H is the number of the data that can be transmitted by the bundled TTIs;

for transmission diversity, $N_L=2$, otherwise, $N_L$ is equal to the number of layers a transport block is mapped onto;

$Q_m$ is a value corresponding to the modulation mode.

In another possible implementation, determining the starting position for data selection according to the unique redundancy version number includes: determining the starting position for the data selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;
$R_{subblock}^{TC}$ is the number of rows of a matrix used during subblock interleaving;
$N_{cb}$ is a size of the buffer for buffering the bit stream after the subblock interleaving;
$rv_{idx}$ is the unique redundancy version number.

In another possible implementation, the transmitting the modulated symbols within each TTI of the bundled TTIs respectively includes:

transmitting modulated symbols corresponding to H/N bits within each TTI, where H is the number of data that can be transmitted by the bundled TTIs, and N is the number of the TTIs in a bundle.

In another aspect, the present invention provides a device for data transmission, including:

a processing module, configured to select a transport block size TBS value according to a preconfigured second table, where the second table is used for describing a corresponding relationship among a TBS value, the number of resource blocks RBs and a TBS index, the number of RBs corresponding to the selected TBS value is smaller than or equal to a specific value, a modulation mode corresponding to a TBS index which corresponds to the selected TBS value is quadrature phase shift keying QPSK, and the selected TBS value is capable of satisfying the rate requirement required during transmission time interval TTI bundling transmission; and a transmitting module, configured to transmit data carried by a physical uplink shared channel PUSCH using bundled TTIs according to the selected TBS value.

In a possible implementation, the transmitting module includes:

a selecting unit, configured to select the data carried by the PUSCH, where the data carried by the PUSCH includes all or part of information bits, the number of the information bits is the selected TBS value, when selecting the data carried by the PUSCH, starting to select data within a storage location range of the information bits, and successively selecting all information bits starting from a selection starting point; and a transmitting unit, configured to transmit the selected data carried by the PUSCH using the bundled TTIs.

In another possible implementation, the selecting unit is specifically configured to:

successively and circularly select the data that can be transmitted by the bundled TTIs.

In another possible implementation, the selecting unit is specifically configured to: start to select data from a position indicated by RV0.

In another possible implementation, further including:

a storage module, configured to store the second table, where the TBS value, the number of RBs and the TBS index described by the second table meet at least one of the following:

in the second table, when the number of the RBs is smaller than or equal to a specific value and the modulation mode corresponding to a TBS index is QPSK, a corresponding TBS value is obtained after amending a TBS value which corresponds to the same number of the RBs and the same TBS index in a first table, such that the amended TBS value is capable of satisfying the rate requirement required during the TTI bundling transmission; or, in the second table, when the number of RBs is smaller than or equal to a specific value and the TBS value is capable of satisfying the rate requirement required during the TTI bundling transmission, the modulation mode corresponding to a corresponding TBS index is obtained after amending a modulation mode corresponding to a TBS index which corresponds to the same number of the RBs and the same TBS value in the first table, such that the amended modulation mode is QPSK; or, in the second table, when the modulation mode corresponding to a TBS index is QPSK and the TBS value is capable of satisfying the rate requirement required during the TTI bundling transmission, the corresponding number of RBs is greater than a maximum value of the number of RBs that can be selected in the first table during the TTI bundling transmission;

where the first table is an existing table used for describing the corresponding relationship among the TBS value, the number of the RBs and the TBS index.

In another possible implementation, the TBS value selected by the processing module is any one of values within a range of [568,2152] and included in the first table.

In another possible implementation, the number of the RBs corresponding to the TBS value selected by the processing module is smaller than or equal to 8.

In another possible implementation, the data carried by the PUSCH is rate matching output data for each code block, the selecting unit is specifically configured to:

determine the number of the data that can be transmitted by the bundled TTIs, and determine a rate matching output sequence length according to the number of the data that can be transmitted by the bundled TTIs;

determine a starting position for data selection according to a unique redundancy version number;

in a buffer for buffering a data stream after subblock interleaving, start to successively and circularly select data whose length is the rate matching output sequence length from a starting position of the data selection, obtain the rate matching output data for each code block, the data stream after the subblock interleaving is a data stream obtained after performing the subblock interleaving to a codestream that is obtained after performing cyclic redundancy check CRC addition, code block segmentation, code block CRC addition and conding to the information bits;

the transmitting unit is specifically configured to:

perform code block cascading to the rate matching output data for each code block;

perform modulation to the code block-cascaded data, and transmit modulated symbols within each TTI of the bundled TTIs respectively.

In another possible implementation, during an initial transmission, the unique redundancy version number used by the transmitting unit is 0; or, during a retransmission, the unique redundancy version number used by the transmitting unit is 0, 1, 2 or 3.

In another possible implementation, the selecting unit is specifically configured to determine the number of the data that can be transmitted by the bundled TTIs according to $H=G \times N$, where $H=G \times N$, where, H is the number of data that can be transmitted by the bundled TTIs;

G is the total number of data available for transmission of a transport block within a TTI;

N is the number of TTIs in a bundle.

In another possible implementation, the selecting unit is specifically configured to determine the rate matching output sequence length according to a following computation formula:

if $r \leq C-\gamma-1$, then $E_r'=N_L \times Q_m \times \lfloor G'/C \rfloor$, otherwise, $E_r'=N_L \times Q_m \times \lceil G'/C \rceil$;

where $E_r'$ is the sequence length;

r is a code block number; C is the number of code blocks obtained during code block segmentation; $\lfloor \ \rfloor$ indicates rounding down, $\lceil \ \rceil$ indicates rounding up;

$\gamma=G'$ mod C, where the mod indicates modulo operation;

$G'=H/(N_L \times Q_m)$, where H is the number of data that can be transmitted by the bundled TTIs;

for transmission diversity, $N_L=2$, otherwise, $N_L$ is equal to the number of layers a transport block is mapped onto;

$Q_m$ is a value corresponding to the modulation mode.

In another possible implementation, the selecting unit is specifically configured to determine a starting position for data selection according to a following computation formula:

$$k_0 = R_{subblock}^{TC} \times \left(2 \times \left\lceil \frac{N_{cb}}{8R_{subblock}^{TC}} \right\rceil \times rv_{idx} + 2 \right)$$

where, $k_0$ is the starting position;

$R_{subblock}^{TC}$ is the number of rows of a matrix used during subblock interleaving;

$N_{cb}$ is a size of the buffer for buffering the bit stream after the subblock interleaving;

$rv_{idx}$ is the unique redundancy version number.

In another possible implementation, the transmitting unit transmits the modulated symbols within each TTI in the bundled TTIs respectively, including:

transmitting modulated symbols corresponding to H/N bits within each TTI, H is the number of data that can be transmitted by the bundled TTIs, and N is the number of TTIs in a bundle.

In still another aspect, the present invention provides a method for data transmission, including:

receiving data carried by a physical uplink shared channel PUSCH transmitted by using bundled transmission time intervals TTIs;

determining a transport block size TBS value, and using the TBS value to process the received data carried by the PUSCH, where the TBS value is selected according to a preconfigured second table, the second table is used for describing a corresponding relationship among a TBS value, the number of RBs and a TBS index, the number of RBs corresponding to the selected TBS value is smaller than or equal to a specific value, a modulation mode corresponding to a TBS index which corresponds to the selected TBS value is quadrature phase shift keying QPSK, and the selected TBS value is capable of satisfying a rate requirement required during TTI bundling transmission.

In a possible implementation, the TBS value, the number of the RBs and the TBS index described by the second table meet at least one of following:

in the second table, when the number of the RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value is capable of satisfying the rate requirement required during the TTI bundling transmission; or, in the second table, when the number of the RBs is smaller than or equal to a specific value and the TBS value is capable of satisfying the rate requirement required during the TTI bundling transmission, the modulation mode corresponding to a corresponding TBS index is obtained after amending a modulation mode corresponding to a TBS index which corresponds to the same number of RBs and the same TBS value in the first table, such that the amended modulation mode is QPSK; or, in the second table, when the modulation mode corresponding to a TBS index is QPSK and the TBS value is capable of satisfying the rate requirement required during the TTI bundling transmission, a corresponding number of RBs is greater than a maximum value of the number of RBs that can be selected in the first table during the ITT bundling transmission;

where the first table is an existing table used for describing the corresponding relationship among the TBS value, the number of the RBs and the TBS index.

In another possible implementation, the selected TBS value is any one of values within a range of [568,2152] and included in the first table.

In another possible implementation, the specific value is 8.

In still another aspect, the present invention provides a device for data transmission, including:

a receiving module, configured to receive data carried by a physical uplink shared channel PUSCH transmitted by using bundled transmission time intervals TTIs;

a processing module, configured to determine a transport block size TBS value, and use the TBS value to process the received data carried by the PUSCH, where the TBS value is selected according to a preconfigured second table, the second table is used for describing a corresponding relationship among a TBS value, the number of RBs and a TBS index, the number of RBs corresponding to the selected TBS value is smaller than or equal to a specific value, a modulation mode corresponding to a' TBS index which corresponds to the selected TBS value is quadrature phase shift keying QPSK, and the selected TBS value is capable of satisfying the rate requirement required during the TTI bundling transmission.

In a possible implementation, the TBS value, the number of the RBs and the TBS index described by the second table which is used by the processing module meet at least one of following:

in the second table, when the number of the RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value is capable of satisfying the rate requirement required during the TTI bundling transmission; or, in the second table, when the number of the RBs is smaller than or equal to a specific value and the TBS value is capable of satisfying the rate requirement required during the TTI bundling transmission, the modulation mode corresponding to a corresponding TBS index is obtained after amending a modulation mode corresponding to a TBS index which corresponds to the same number of the RBs and the same TBS value in the first table, such that the amended modulation mode is QPSK; or, in the second table, when the modulation mode corresponding to a TBS index is QPSK and the TBS value is capable of satisfying the rate requirement required during the TTI bundling transmission, the corresponding number of RBs is greater than a maximum value of the number of RBs that can be selected in the first table during the TTI bundling transmission;

where the first table is an existing table used for describing the corresponding relationship among the TBS value, the number of the RBs and the TBS index.

In another possible implementation, the TBS value selected by the processing module is any one of values within a range of [568,2152] and included in the first table.

In another possible implementation, the number of the RBs corresponding to the TBS value selected by the processing module is smaller than or equal to 8.

In another aspect, the present invention also provides a method for selecting data when transmission time intervals TTIs are bundled, including:

determining data that can be transmitted by the bundled TTIs;

successively and circularly selecting the data that can be transmitted by the bundled TTIs.

In a possible implementation, a selection starting point of the successively and circularly selecting is a position indicated by RV0.

In another possible implementation, the data is data carried by a physical uplink shared channel PUSCH, and the method further includes:

during an initial transmission, transmitting data that starts to be selected successively and circularly from the position indicated by the RV0.

In another possible implementation, the successively and circularly selecting the data that can be transmitted by the bundled TTIs includes:

determining a rate matching output sequence length according to the number of the data that can be transmitted by the bundled TTIs;

determining a starting position for data selection according to a unique redundancy version number;

in a buffer for buffering a data stream after subblock interleaving, starting to successively and circularly select data whose length is the rate matching output sequence length from the starting position for the data selection.

In another possible implementation, during an initial transmission, the unique redundancy version number is 0; or, during a retransmission, the unique redundancy version number is 0, 1, 2 or 3.

In another possible implementation, the determining the rate matching output sequence length according to the number of the data that can be transmitted by the bundled TTIs includes: determining the rate matching output sequence length according to a following computation formula:

if $r \leq C-\gamma-1$, then $E_r'=N_L \times Q_m \times \lfloor G'/C \rfloor$, otherwise, $E_r'=N_L \times Q_m \times \lceil G'/C \rceil$;

where, $E_r'$ is the rate matching output sequence length;

r is a code block number; C is the number of code blocks obtained during code block segmentation; $\lfloor \ \rfloor$ indicates rounding down, $\lceil \ \rceil$ indicates rounding up;

$\gamma = G'$ mod C, the mod indicates modulo operation;

$G' = H/(N_L \times Q_m)$, H is the number of data that can be transmitted by the bundled TTIs;

for transmission diversity, $N_L = 2$, otherwise, $N_L$ is equal to the number of layers a transport block is mapped onto;

$Q_m$ is a value corresponding to the modulation mode;

where, a computation formula of H is:

$$H = G \times N$$

G is the total number of data available for transmission of a transport block within a TTI;

N is the number of TTIs in a bundle.

In another possible implementation, the determining the starting position for bit selection according to the unique redundancy version number includes: determining the starting position for the bit selection according to the following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during subblock interleaving;

$N_{cb}$ is a size of the buffer for buffering the bit stream after the subblock interleaving;

$rv_{idx}$ is the unique redundancy version number.

In another aspect, the present invention also provides a device for selecting data when TTIs are bundled, including:

a determining module, configured to determine data that can be transmitted by the bundled TTIs;

a selecting module, configured to successively and circularly select the data that can be transmitted by the bundled TTIs.

In a possible implementation, a selection starting point of the successively and circularly selecting by the selecting module is a position indicated by RV0.

In another possible implementation, further including:

a transmitting module, configured to, during an initial transmission, transmit data that starts to be selected successively and circularly from the position indicated by the RV0.

In another possible implementation, the selecting module is specifically configured to:

determine a rate matching output sequence length according to the number of the data that can be transmitted by the bundled TTIs;

determine a starting position for data selection according to a unique redundancy version number;

in a buffer for buffering a data stream after subblock interleaving, start to successively and circularly select data whose length is the rate matching output sequence length from the starting position for the data selection.

In another possible implementation, during an initial transmission, the unique redundancy version number used by the selecting module is 0; or, during a retransmission, the unique redundancy version number used by the selecting module is 0, 1, 2 or 3.

In another possible implementation, the selecting module is specifically configured to determine the rate matching output sequence length according to a following computation formula:

if $r \leq C - \gamma - 1$, then $E_r' = N_L \times Q_m \times \lfloor G'/C \rfloor$, otherwise, $E_r' = N_L \times Q_m \times \lceil G'/C \rceil$;

where, $E_r'$ is the sequence length;

r is a code block number; C is the number of code blocks obtained during code block segmentation; $\lfloor \ \rfloor$ indicates rounding down, $\lceil \ \rceil$ indicates rounding up;

$\gamma = G'$ mod C, where the mod indicates modulo operation;

$G' = H/(N_L \times Q_m)$, where H is the data that can be transmitted by the bundled TTIs;

for transmission diversity, $N_L = 2$, otherwise, $N_L$ is equal to the number of layers to which a transport block is mapped;

$Q_m$ is a value corresponding to the modulation mode;

where, a computation formula of H is:

$$H = G \times N,$$

G is the total number of data available for transmission of a transport block within a TTI;

N is the number of TTIs in a bundle.

In another possible implementation, the selecting module is specifically configured to determine the starting position for the data selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during the subblock interleaving;

$N_{cb}$ is a size of the buffer for buffering the bit stream after the subblock interleaving;

$rv_{idx}$ is the unique redundancy version number.

In another aspect, a method for transmitting bits is provided, including:

determining the number of bits that can be transmitted by bundled transmission time intervals TTIs, and determining a rate matching output sequence length according to the number of bits that can be transmitted by the bundled TTIs;

determining a starting position for bit selection according to a unique redundancy version number;

in a buffer for buffering a bit stream after subblock interleaving, starting to successively and circularly select bits whose length is the rate matching output sequence length from the starting position for the bit selection, and obtaining bits after each code block is rate-matched;

performing code block cascading to the bits after each code block is rate-matched;

performing modulation to the code block-cascaded bits, and transmitting modulated symbols within each TTI of the bundled TTIs respectively.

In a possible implementation, during an initial transmission, the unique redundancy version number is 0; or, during a retransmission, the unique redundancy version number is 0, 1, 2 or 3.

In another possible implementation, the determining the number of the bits that can be transmitted by the bundled TTIs includes: determining the number of the bits that can be transmitted by the bundled TTIs according to a following computation formula:

$$H = G \times N, \text{ where,}$$

H is the number of bits that can be transmitted by the bundled TTIs;

G is the total number of bits available for transmission of a transport block within a TTI;

N is the number of TTIs in a bundle.

In another possible implementation, the determining the rate matching output sequence length according to the number of bits that can be transmitted by the bundled TTIs includes: determining the rate matching output sequence length according to a following computation formula:

if $r \leq C-\gamma-1$, then $E_r' = N_L \times Q_m \times \lfloor G'/C \rfloor$, otherwise,
$E_r' = N_L \times Q_m \times \lceil G'/C \rceil$;

where, $E_r'$ is the length of the sequence;

r is a code block number; C is the number of code blocks obtained during code block segmentation; $\lfloor\ \rfloor$ indicates rounding down, $\lceil\ \rceil$ indicates rounding up;

$\gamma = G'$ mod C, where the mod indicates modulo operation;

$G' = H/(N_L \times Q_m)$, where H is the number of bits that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

In another possible implementation, the determining the starting position for the bit selection according to the unique redundancy version number includes: determining the starting position for the bit selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during the subblock interleaving;

$N_{cb}$ is a size of the buffer for buffering the bit stream after the subblock interleaving;

$rv_{idx}$ is the unique redundancy version number.

In another possible implementation, the transmitting the modulated symbols within each TTI of the bundled TTIs respectively includes:

transmitting modulated symbols corresponding to H/N bits within each TTI, H is the number of bits that can be transmitted by the bundled TTIs, and N is the number of TTIs in a bundle.

In another aspect, a device for transmitting bits is provided, including:

a first determining module, configured to determine the number of bits that can be transmitted by bundled transmission time intervals TTIs, and determine a rate matching output sequence length according to the bits that can be transmitted by the bundled TTIs;

a second determining module, configured to determine a starting position for bit selection according to a unique redundancy version number;

a selecting module, configured to, in a buffer for buffering a bit stream after subblock interleaving, start to successively and circularly select bits whose length is the rate matching output sequence length from the starting position for the bit selection;

a cascading module, configured to perform code block cascading to bits after each code block is rate-matched;

a transmitting module, configured to perform modulation to the code block-cascaded bits, and transmit modulated symbols within each TTI of the bundled TTIs respectively.

In a possible implementation, during an initial transmission, the unique redundancy version number used by the second determining module is 0; or, during a retransmission, the unique redundancy version number used by the second determining module is 0, 1, 2 or 3.

In another possible implementation, the first determining module is specifically configured to determine the number of bits that can be transmitted by the bundled TTIs according to a following computation formula:

$H = G \times N$, where,

H is the number of bits that can be transmitted by the bundled TTIs;

G is the total number of bits available for transmission of a transport block within a TTI;

N is the number of TTIs in a bundled.

In another possible implementation, the first determining module is specifically configured to determine the rate matching output sequence length according to a following computation formula:

if $r \leq C-\gamma-1$, then $E_r' = N_L \times Q_m \times \lfloor G'/C \rfloor$, otherwise,
$E_r' = N_L \times Q_m \times \lceil G'/C \rceil$;

where, $E_r'$ is the rate matching output sequence length;

r is a code block number; C is the number of code blocks obtained during code block segmentation; $\lfloor\ \rfloor$ indicates rounding down, $\lceil\ \rceil$ indicates rounding up;

$\gamma = G'$ mod C, the mod indicates modulo operation;

$G' = H/(N_L \times Q_m)$, H is the number of bits that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

In another possible implementation, the second determining module is specifically configured to determine the starting position for the bit selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during subblock interleaving;

$N_{cb}$ is a size of the buffer for buffering the bit stream after the subblock interleaving;

$rv_{idx}$ is the unique redundancy version number.

In another possible implementation, the transmitting module is specifically configured to:

transmit modulated symbols corresponding to H/N bits within each TTI, H is the number of bits that can be transmitted by the bundled TTIs, and N is the number of TTIs in a bundle.

In another aspect, a UE is provided, including:

a processor, configured to select a transport block size TBS value according to a preconfigured second table, where the second table is used for describing the corresponding relationship among a TBS value, the number of resource blocks RBs and a TBS index, the number of RBs corresponding to the selected TBS value is smaller than or equal to a specific value, the modulation mode corresponding to a TBS index which corresponds to the selected TBS value is quadrature phase shift keying QPSK, and the selected TBS value is capable of satisfying a rate requirement required during transmission time interval TTI bundling transmission; and a transmitter, configured to transmit data carried by a physical uplink shared channel PUSCH using bundled TTIs according to the selected TBS value.

In a possible implementation, the processor is specifically configured to:

select the data carried by the PUSCH, where the data carried by the PUSCH including all or part of information bits, the number of the information bits is the selected TBS value, when selecting the data carried by the PUSCH, start to select data within a storage location range of the information bits, and successively select all information bits starting from a selection starting point; and transmit the selected data carried by the PUSCH using the bundled TTIs.

In another possible implementation, the processor is specifically configured to:

successively and circularly select the data that can be transmitted by the bundled TTIs.

In another possible implementation, the processor is specifically configured to determine a position indicated by RV0 as the selection starting point.

In another possible implementation, the transmitter is specifically configured to:

during an initial transmission, transmit consecutive data that starts to be selected from the position indicated by the RV0.

In another possible implementation, the TBS value, the number of the RBs and the TBS index described by the second table used by the processor meet at least one of following:

in the second table, when the number of the RBs is smaller than or equal to a specific value and the modulation mode corresponding to a TBS index is QPSK, a corresponding TBS value is obtained after amending a TBS value which corresponds to the same number of the RBs and the same TBS index in a first table, such that the amended TBS value is capable of satisfying the rate requirement required during TTI bundling transmission; or, in the second table, when the number of the RBs is smaller than or equal to a specific value and the TBS value is capable of satisfying the rate requirement required during the TTI bundling transmission, the modulation mode corresponding to a corresponding TBS index is obtained after amending a modulation mode corresponding to a TBS index which corresponds to the same number of the RBs and the same TBS value in the first table, such that the amended modulation mode is QPSK; or, in the second table, when the modulation mode corresponding to a TBS index is QPSK and the TBS value is capable of satisfying the rate requirement required during TTI bundling transmission, the corresponding number of RBs is greater than a maximum value of the number of RBs that can be selected in the first table during the TTI bundling transmission;

where the first table is an existing table used for describing the corresponding relationship among the TBS value, the number of the RBs and the TBS index.

In another possible implementation, the TBS value selected by the processor is any one of values within a range of [568,2152] and included in the first table.

In another possible implementation, the specific value in the second table used by the processor is 8.

In another possible implementation, the data carried by the PUSCH is rate matching output data for each code block, and the processor is specifically configured to:

determine the number of the data that can be transmitted by the bundled TTIs, and determine a rate matching output sequence length according to the number of the data that can be transmitted by the bundled TTIs;

determine a starting position for data selection according to a unique redundancy version number;

in a buffer for buffering a data stream after subblock interleaving, start to successively and circularly select data whose length is the rate-matching output sequence length from the starting position for the data selection, obtain the rate matching output data for each code block, the data stream after the subblock interleaving is a data stream obtained after performing subblock interleaving to a coded codestream that is obtained after performing cyclic redundancy check CRC addition, code block segmentation, code block CRC addition and conding to the information bits;

perform code block cascading to the rate matching output data for each code block;

perform modulation to the code block-cascaded data;

the transmitter is specifically configured to:

transmit modulated symbols obtained after the modulation within each TTI of the bundled TTIs respectively.

In another possible implementation, during an initial transmission, the unique redundancy version number used by the processor is 0; or, during a retransmission, the unique redundancy version number used by the processor is 0, 1, 2 or 3.

In another possible implementation, the processor is specifically configured to determine the number of the data that can be transmitted by the bundled TTIs according to the following computation formula:

$H = G \times N$, where,

H is the number of data that can be transmitted by the bundled TTIs;

G is the total number of data available for transmission of a transport block within a TTI;

N is the number of TTIs in a bundle.

In another possible implementation, the processor is specifically configured to determine the rate matching output sequence length according to a following computation formula:

$$\text{if } r \leq C-\gamma-1, \text{ then } E_r' = N_L \times Q_m \times \lfloor G'/C \rfloor, \text{ otherwise,}$$
$$E_r' = N_L \times Q_m \times \lceil G'/C \rceil;$$

where, $E_r'$ is the sequence length;

r is a code block number; C is the number of code blocks obtained during code block segmentation; $\lfloor \ \rfloor$ indicates rounding down, $\lceil \ \rceil$ indicates rounding up;

$\gamma = G' \bmod C$, where the mod indicates modulo operation;

$G' = H/(N_L \times Q_m)$, where H is the number of data that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

In another possible implementation, the processor is specifically configured to determine the starting position for data selection according to a following computation formula:

$$k_0 = R_{subblock}^{TC} \times \left( 2 \times \left\lceil \frac{N_{cb}}{8 R_{subblock}^{TC}} \right\rceil \times rv_{idx} + 2 \right)$$

where, $k_0$ is the starting position;

$R_{subblock}^{TC}$ is the number of rows of a matrix used during the subblock interleaving;

$N_{cb}$ is a size of the buffer for buffering the bit stream after the subblock interleaving;

$rv_{idx}$ is the unique redundancy version number.

In another possible implementation, the transmitter is specifically configured to transmit modulated symbols corresponding to H/N bits within each TTI, H is the number of data that can be transmitted by the bundled TTIs, and N is the number of TTIs in a bundle.

In another aspect, a base station is provided, including:

a receiver, configured to receive data carried by a physical uplink shared channel PUSCH transmitted by using bundled transmission time intervals TTIs;

a processor, configured to determine a transport block size TBS value, and use the TBS value to process the data carried by the PUSCH which is received, where the TBS value is selected according to a preconfigured second table, the second table is used for describing a corresponding relationship among a TBS value, the number of RBs and a TBS index, the number of RBs corresponding to the selected TBS value is smaller than or equal to a specific value, a modulation mode corresponding to a TBS index which corresponds to the selected TBS value is quadrature phase shift keying QPSK, and the selected TBS value is capable of satisfying a rate requirement required during TTI bundling transmission.

In a possible implementation, the TBS value, the number of the RBs and the TBS index described by the second table used by the processor meet at least one of following:

in the second table, when the number of RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value is capable of satisfying the rate requirement required during the TTI bundling transmission; or, in the second table, when the number of the RBs is smaller than or equal to a specific value and the TBS value is capable of satisfying the rate requirement required during TTI bundling transmission, a modulation mode corresponding to a corresponding TBS index is obtained after amending a modulation mode corresponding to a TBS index which corresponds to the same number of RBs and the same TBS value in the first table, such that the amended modulation mode is QPSK; or, in the second table, when the modulation mode corresponding to a TBS index is QPSK and the TBS value is capable of satisfying the rate requirement required during the TTI bundling transmission, the corresponding number of RBs is greater than a maximum value of the number of RBs that can be selected in the first table during the TTI bundling transmission;

where the first table is an existing table used for describing the corresponding relationship among the TBS value, the number of the RBs and the TBS index.

In another possible implementation, the selected TBS value selected by the processor is any one of values within a range of [568,2152] and included in the first table.

In another possible implementation, the specific value in the second table used by the processor is 8.

In another aspect, a UE is provided, including:

a memory, configured to store data;

a processor, configured to determine data that can be transmitted by bundled TTIs, and successively and circularly select in the memory the data that can be transmitted by the bundled TTIs.

In a possible implementation, the processor is specifically configured to: a selection starting point of the successively and circularly selecting is a position indicated by RV0.

In another possible implementation, the data is data carried by a physical uplink shared channel PUSCH, and the UE further includes:

a transmitter, configured to, during an initial transmission, transmit data that starts to be selected successively and circularly from the position indicated by the RV0.

In another possible implementation, the memory is specifically used for buffering a data stream after subblock interleaving;

the processor is specifically configured to: determine a rate matching output sequence length according to the number of the data that can be transmitted by the bundled TTIs; determine a starting position for data selection according to a unique redundancy version number; in the memory, start to successively and circularly select data whose length is the rate matching output sequence length from the starting position for the data selection.

In another possible implementation, during an initial transmission, the unique redundancy version number used by the processor is 0; or, during a retransmission, the unique redundancy version number used by the processor is 0, 1, 2 or 3.

In another possible implementation, the processor is specifically configured to determine the rate matching output sequence length according to a following computation formula:

if $r \leq C-\gamma-1$, then $E_r'=N_L \times Q_m \times \lfloor G'/C \rfloor$, otherwise, $E_r'=N_L \times Q_m \times \lceil G'/C \rceil$;

where, $E_r'$ is the rate matching output sequence length;

r is a code block number; C is the number of code blocks obtained during code block segmentation; $\lfloor \ \rfloor$ indicates rounding down, $\lceil \ \rceil$ indicates rounding up;

$\gamma = G'$ mod C, where the mod indicates modulo operation; $G'=H/(N_L \times Q_m)$, where H is the number of data that can be transmitted by the bundled TTIs;

for transmission diversity, $N_L=2$, otherwise, $N_L$ is equal to the number of layers a transport block is mapped onto;

$Q_m$ is a value corresponding to the modulation mode;

where, a computation formula of H is:

$H = G \times N$,

G is the total number of data available for transmission of a transport block within a TTI;

N is the number of TTIs in a bundle.

In another possible implementation, the processor is specifically configured to determine the starting position for the data selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during the subblock interleaving;

$N_{cb}$ is a size of the buffer for buffering the bit stream after the subblock interleaving;

$rv_{idx}$ is the unique redundancy version number.

In another aspect, a UE is provided, including:

a memory, configured to store a bit stream after subblock interleaving;

a processor, configured to determine the number of bits that can be transmitted by bundled transmission time intervals TTIs; determine a rate matching output sequence length according to the number of the bits that can be transmitted by the bundled TTIs; determine a starting position for bit selection according to a unique redundancy version number; in the memory, start to successively and circularly select bits whose length is the rate matching output sequence length from the starting position for the bit selection, obtain bits after each code block is rate-matched; perform code block cascading to the bits after each code block is rate-matched; perform modulation to the code block-cascaded bits;

a transmitter, configured to transmit modulated symbols within each TTI of the bundled TTIs respectively.

In a possible implementation, during an initial transmission, the unique redundancy version number used by the processor is 0; or, during a retransmission, the unique redundancy version number used by the processor is 0, 1, 2 or 3.

In another possible implementation, the processor is specifically configured to determine the number of the bits that can be transmitted by the bundled TTIs according to a following computation formula:

$$H = G \times N, \text{ where,}$$

H is the number of bits that can be transmitted by the bundled TTIs;

G is the total number of bits available for transmission of a transport block within a TTI;

N is the number of the bundled TTIs.

In another possible implementation, the processor is specifically configured to determine the rate matching output sequence length according to a following computation formula:

$$\text{if } r \leq C-\gamma-1, \text{ then } E_r' = N_L \times Q_m \times \lfloor G'/C \rfloor, \text{ otherwise,}$$
$$E_r' = N_L \times Q_m \times \lceil G'/C \rceil;$$

where, $E_r'$ is the length of the sequence;

r is a code block number; C is the number of code blocks obtained during code block segmentation; $\lfloor \ \rfloor$ indicates rounding down, $\lceil \ \rceil$ indicates rounding up;

$\gamma = G'$ mod C, where the mod indicates modulo operation;

$G' = H/(N_L \times Q_m)$, where H is the number of bits that can be transmitted by the bundled TTIs;

for transmission diversity, $N_L=2$, otherwise, $N_L$ is equal to the number of layers to which a transport block is mapped;

$Q_m$ is a value corresponding to the modulation mode.

In another possible implementation, the processor is specifically configured to determine the starting position for the bit selection according to a following computation formula:

$$k_0 = R_{subblock}^{TC} \times \left( 2 \times \left\lceil \frac{N_{cb}}{8 R_{subblock}^{TC}} \right\rceil \times rv_{idx} + 2 \right)$$

where, $k_0$ is the starting position;

$R_{subblock}^{TC}$ is the number of rows of a matrix used during subblock interleaving;

$N_{cb}$ is a size of a buffering for buffering the bit stream after the subblock interleaving;

$rv_{idx}$ is the unique redundancy version number.

In another possible implementation, the transmitter is specifically configured to: transmit modulated symbols corresponding to H/N bits within each TTI, H is the number of bits can be transmitted by the bundled TTIs, N is the number of TTIs in a bundle.

In another aspect, a method for receiving bits is provided, including:

receiving modulated symbols transmitted by bundled TTIs;

processing the modulated symbols according to a unique redundancy version number.

In a possible implementation, during an initial transmission, the unique redundancy version number is 0; or, during a retransmission, the unique redundancy version number is 0, 1, 2 or 3.

In another aspect, a base station is provided, including:

a receiver, configured to receive modulated symbols transmitted by bundled TTIs and send the modulated symbols to a processor;

the processor, configured to process the modulated symbols according to a unique redundancy version number.

In a possible implementation, during an initial transmission, the unique redundancy version number used by the processor is 0; or, during a retransmission, the unique redundancy version number is 0, 1, 2 or 3.

It can be known from the foregoing technical solutions, the present invention provides a second table as described, the second table indicates that a TBS value therein is relatively large, a RB corresponding to the TBS is relatively small and a modulation mode corresponding to the TBS is QPSK, since the TBS value is relatively large, a requirement of a PUSCH at an intermediate rate can be satisfied during TTI bundling, and a larger Turbo coding gain can be obtained and overhead can be reduced, a better MCL value can be obtained by using the relatively small RB and the QPSK, therefore, coverage at the PUSCH medium data rate can be improved by using the above ways.

BRIEF DESCRIPTION OF DRAWINGS

In order to make technical solutions in embodiments of the present invention more clearly, accompanying drawings used for the description of the embodiments will be briefly described hereunder. Obviously, the described drawings are merely some embodiments of present invention. For persons skilled in the art, other drawings may be obtained based on these drawings without any inventive efforts.

DESCRIPTION OF EMBODIMENTS

Figure 1:
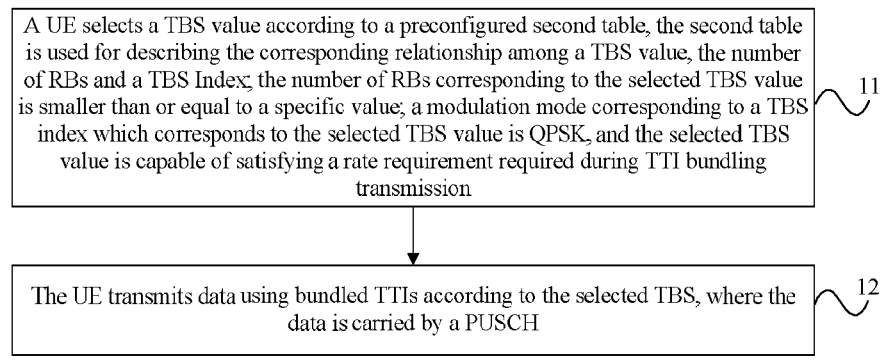
FIG. 1 is a schematic flow chart of a method for data transmission according to an embodiment of the present invention.

In order to make objectives, technical solutions, and advantages of embodiments of the present invention more clearly, the technical solutions in embodiments of the present invention will be hereinafter described clearly and completely with reference to the accompanying drawings in embodiments of the present invention. Obviously, the described embodiments are only a part of embodiments of the present invention, rather than all embodiments of the present invention. All other embodiments obtained by persons of ordinary skill in the art based on the embodiments of the present invention without any creative efforts shall fall within the protection scope of the present invention.

In the prior art, reference may be made to table 1 for a TBS value that may be used when a PUSCH transmits data:

TABLE 1

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

In table 1, $N_{PRB}$ indicates the number of RBs, $I_{TBS}$ indicates a TBS index, a value of $I_{TBS}$ can be determined through table 2.

TABLE 2

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |

TABLE 2-continued

| MCS Index $I_{MCS}$ | Modulation Order $Q'_m$ | TBS Index $I_{TBS}$ | Redundancy Version $rv_{idx}$ |
|---|---|---|---|
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

In table 2, $I_{MCS}$ is a modulation and coding scheme (MCS) index, $rv_{idx}$ represents a redundancy version used during PUSCH data transmission, $Q_m'$ represents a modulation mode, when $Q_m'$ equals to 2, it indicates QPSK modulation mode, 4 and 6 represent 16 quadrature amplitude modulation (QAM) modulation mode and 64 QAM modulation mode respectively.

In the prior art, information such as an MCS index $I_{MCS}$ and the selected number $N_{PRB}$ of RBs are included in an uplink scheduling command (UL grant) by a base station, so as to schedule transmission of uplink data. The base station can also configure a UE to transmit data on PUSCH by using a TTI bundling way. In the prior art, applications of the TTI bundling scheme can only be limited to a case where the number of RBs is less than or equal to 3 and the modulation mode is QPSK. Then, in such limitation, a TBS value that can be used during TTI bundling is a value corresponding to $N_{PRB}$ being 1~3 and $I_{TBS}$ being 0~10, it can be seen from table 1, the maximum value of the TBS value is 504 at this time.

As described in the background portion, as for a TTI bundling scenario where four consecutive subframes are bundled, when the TBS value is 504, requirements for a PUSCH medium data rate cannot be satisfied.

In order to satisfy the requirement of the PUSCH medium data rate, taking the PUSCH medium data rate being 384 kbps as an example, when using four TTIs for bundling and block error rate (BLER) being 10%, the TBS needs to be at least: 384×4/90%=1707.

Again, a value of the set number closest to 1707 can be selected with reference to table 1, for example, being selected as 1736 or 1800.

That is to say, in embodiments of the present invention, the coverage requirement of the PUSCH medium data rate needs to be satisfied, and it is required to be satisfied simultaneously that: a RB is relatively small, QPSK modulation mode is used and a TBS value is relatively large. The RB being relatively small means that the number of RBs is smaller than or equal to a specific value, the specific value, e.g. is 8, the TBS value being relatively large means that the TBS value is capable of satisfying the requirements for the PUSCH medium data rate during a TTI bundling transmission way, i.e. the TBS value is at least: (PUSCH medium data rate)×(the number of bundled TTIs)(1−BLER), for example, is a value within a range of [568,2152] and the value is an existing value in the current table (table 1), such as 1736 or 1800. In the embodiments hereunder, for the sake of simplicity, the number of RBs being smaller than or equal to a specific value is referred to as a RB being relatively small, and a TBS value which is capable of satisfying the requirement for the PUSCH medium data rate during the TTI bundling is referred to as a TBS value being relatively large.

However, it can also be seen from table 1, when a TBS value is 1736 or 1800, the modulation mode corresponding thereto is not QPSK any longer and/or the corresponding number of RBs is not relatively small any longer either, for example, when $I_{TBS}=14$ and $N_{PRB}=6$, the corresponding TBS is 1736, however, the modulation mode at this time is 16 QAM.

In embodiments of the present invention, in order to simultaneously satisfy the above conditions of the RB being relatively small, QPSK modulation mode being used and the TBS value being relatively large, amendments can be made to table 1, and the amended table is taken as a second table. The following can be included:

Manner 1: in the second table, when the number of RBs is smaller than or equal to a specific value and the modulation mode corresponding to a TBS index is QPSK, the corresponding TBS value is obtained after amending a TBS value which corresponds to the same number of RBs and the same TBS index in the first table, such that the amended TBS value can satisfy the rate requirement required during TTI bundling transmission.

For example, originally, the TBS value corresponding to $I_{TBS}=8$ and $N_{PRB}=3$ is 392, while in embodiments of the present invention, the TBS value corresponding to $I_{TBS}=8$ and $N_{PRB}=3$ is amended to 1736.

Manner 2: in the second table, when the number of RBs is smaller than or equal to a specific value and the TBS value is capable of satisfying the rate requirement required during TTI bundling transmission, a modulation mode which corresponds to a corresponding TBS index is obtained after amending a modulation mode corresponding to the TBS index which corresponds to the same number of RBs and the same TBS value in the first table, and the amended modulation mode is QPSK.

For example, originally, $N_{PRB}=3$ and TBS=1736 correspond to $I_{TBS}=23$, and the modulation mode when $I_{TBS}=23$ is 64 QAM, while in embodiments of the present invention, the modulation mode when $I_{TBS}=23$ is amended to QPSK.

Manner 3: in the second table, when a modulation mode corresponding to a TBS index is QPSK and a TBS value is capable of satisfying the rate requirement required during TTI bundling transmission, the corresponding number of RBs is greater than the maximum value of the selectable numbers of RBs in the first table during TTI bundling transmission;

For example, in the prior art, the maximum value of the number of RBs which can be selected during TTI bundling transmission is 3 in the first table, while in embodiments of the present invention, the number of RBs which is selectable can be enlarged, for example, be enlarged to 8, then according to the first table (table 1), when the number of RBs that can be selected is smaller than or equal to 8, a TBS value which satisfies the rate requirement required during TTI bundling transmission as described above can also be found and a corresponding modulation mode is QPSK.

Specifically, the present invention provides the following embodiments.

FIG. 1 is a schematic flow chart of a method for data transmission according to an embodiment of the present invention, including:

Step 11, a UE selects a TBS value according to a preconfigured second table, the second table is used for describing the corresponding relationship among a TBS value, the number of RBs and a TBS Index; the number of RBs corresponding to the selected TBS value is smaller than or equal to a specific value; a modulation mode corresponding to a TBS index which corresponds to the selected TBS value is QPSK, and the selected TBS value is capable of satisfying a rate requirement required during TTI bundling transmission;

Step 12, the UE transmits data using bundled TTIs according to the selected TBS, where the data is carried by a PUSCH.

In embodiments of the present invention, the current table, i.e. table 1 is referred to as a first table, and a table newly proposed in embodiments of the present invention is referred to as a second table, both the first table and the second table can be preconfigured within the UE.

Additionally, uplink data of the UE is scheduled by a base station, i.e. before step 11, can further include: the UE receives configuration information sent by the base station, where the configuration information is configured to indicate that the data carried by the PUSCH is transmitted by using bundled TTIs; and, the UE receives scheduling information sent by the base station, where an MCS index and the number of RBs are included in the scheduling information.

After receiving the scheduling information, the UE can obtain a corresponding TBS index $I_{TBS}$ through looking up according to the MCS index included therein and table 2 (table 2 can be preconfigured within the UE), and then obtain a TBS value through looking up according to $I_{TBS}$, the number of RBs $N_{PRB}$ and the second table (in the prior art, according to table 1). Then, the data carried by the PUSCH can be transmitted using bundled TTIs according to the TBS value looked up and the configuration information received. There is only a first table in the prior art, thus the first table is used regardless of whether TTIs are bundled, however, as described in the background portion, according to the current first table, when the TTIs are bundled, a TBS in a manner where RBs are smaller than or equal to 3 and the modulation mode is QPSK, i.e. the TBS corresponding to $N_{PRB}$ being 1~3 and $I_{TBS}$ being 0~10 in table 1, is not capable of satisfying the rate requirement of the PUSCH medium data rate. Therefore, a second table is newly proposed in the embodiments of the present invention, the second table is used when TTIs are bundled, in the second table, the TBS that corresponds to the relatively small RB and the QPSK modulation mode is relatively large so as to satisfy the requirement of the PUSCH medium data rate.

The second table simultaneously meets that the RB is relatively small, the QPSK modulation mode is used and the TBS is relatively large, in this way, TTI bundling manner can be used for transmitting service data at the PUSCH medium data rate.

This embodiment provides a second table as described above, the second table indicates that the TBS value therein is relatively large, the RB corresponding to the TBS is relatively small and the modulation mode corresponding to the TBS is QPSK, since the TBS value is relatively large, requirements of the PUSCH medium rate can be satisfied, and a larger Turbo coding gain can be obtained and overhead can be reduced, a better MCL value can be obtained by using the relatively small RB and the QPSK, therefore, coverage at the PUSCH medium data rate can be improved by using the above ways.

Furthermore, when data carried by a PUSCH is transmitted by using bundled TTIs according to a TBS selected in accordance with the second table, there will be a problem that more information bits will be lost if according to an existing transmission method. Taking 4 consecutive subframes being bundled as an example, in the prior art, when data is transmitted by using a TTI bundling way, 4 redundancy versions of a coded transport block are mapped within 4 consecutive TTIs respectively, these 4 redundancy version numbers can be 0, 2, 3, 1. After Turbo 1/3 coding is performed to information bits, rate matching needs to be performed according to the size of available resources, a redundancy version number indicates a starting position of the data selected during the rate matching in the data obtained after the Turbo 1/3 coding. However, such transmission method may result in an information bit loss.

Figure 2:
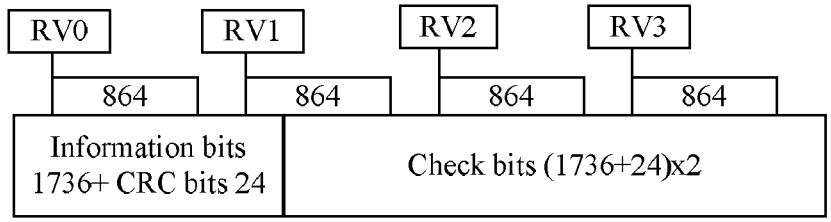
FIG. 2 is a schematic diagram of a data mapping way in the prior art.

For example, with reference to FIG. 2, assuming that the TBS value=1736, the number of RBs corresponding thereto is 3, then the number of bits that can be transmitted within a TTI=12 (the number of subcarriers within each RB)×12 (the number of data symbols within each RB)×3 (the number of RBs)×2 (the number of bits corresponding to each QPSK modulated symbol)=864 bits. 1736 information bits are added with 24 bits of cyclic check (Cyclic Redundancy Check, CRC) firstly, and then added with (1736+24)×2 check bits to complete the Turbo 1/3 coding. Data to be transmitted by using the TTI bundling manner includes information bits and check bits, different redundancy versions indicate different starting positions of the selected data in the data after the Turbo 1/3 coding, different redundancy versions are represented as RV0, RV1, RV2 and RV3 respectively, it can be seen from FIG. 2, when each subframe selects data of 864 bits for transmission, there will be data that has not been selected between subframes, that is to say, some information bits are lost, e.g., data that has not been selected between RV0 and RV1 are lost.

In order to solve this problem, the present invention provides an embodiment as follow.

Figure 3:
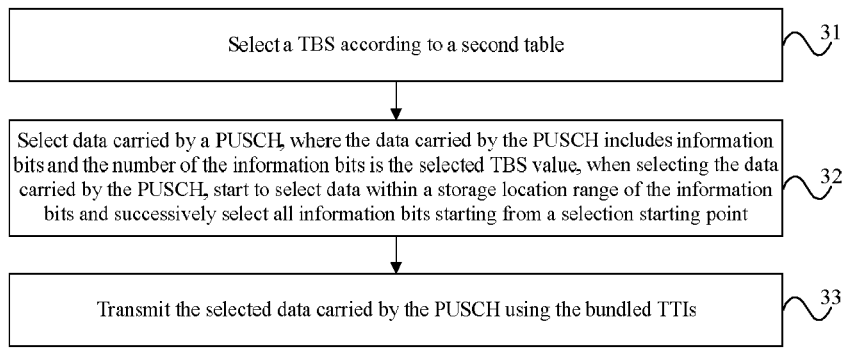
FIG. 3 is a schematic flow chart of a method for data transmission according to an embodiment of the present invention.

FIG. 3 is a schematic flow chart of a method for data transmission according to another embodiment of the present invention.

Step 31, select a TBS according to a second table.

Reference may be made to step 11 for specific contents.

Then, data carried by a PUSCH can be transmitted by using bundled TTIs according to the selected TBS, the following steps 32~33 can be included specifically.

Step 32, select data carried by a PUSCH, where the data carried by the PUSCH include information bits and the number of the information bits is the selected TBS value, when selecting the data carried by the PUSCH, start to select data within a storage location range of the information bits, and successively select all information bits starting from a selection starting point.

Since the number of the information bits is a TBS selected according to the second table, if according to a selecting manner of the prior art, a part of the information bits will be lost. While a manner of successively selecting the information bits is used in this embodiment, since all information bits starting from the selection starting point are selected successively, an insuccessive situation will not occur, coverage to the information bits from a position indicated by RV0 to a position indicated by RV1 will be increased, and the number of the information bits which are lost will be reduced.

Figure 4:
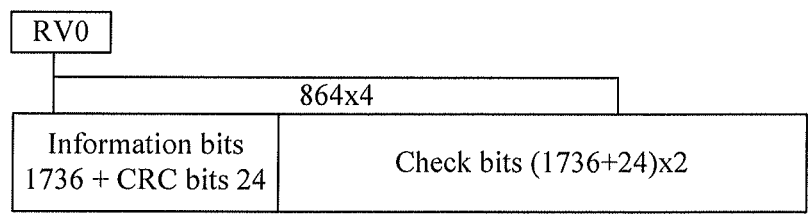
FIG. 4 is a schematic diagram of a data mapping way in the present invention.

Optionally, in order to ensure that all information bits starting from the selection starting point are selected successively, data that can be transmitted by the bundled TTIs can be selected successively and circularly, for example, referring to FIG. 4 which takes each subframe being capable of transmitting data of 864 bits as an example, in a scenario where 4 subframes are bundled, this embodiment can successively select data of 864×4 bits, a redundancy version number corresponding to the data selected successively, i.e. the data of 864×4 bits, can be named as RV0.

Figure 5:
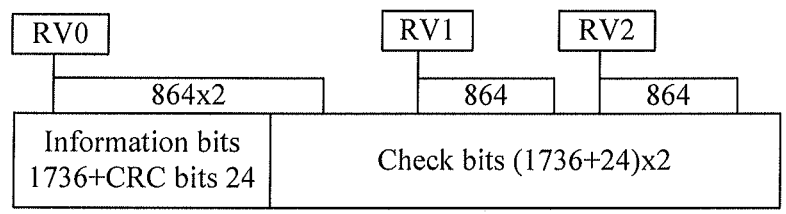
FIG. 5 is a schematic diagram of another data mapping way in the present invention.

Optionally, if the starting position indicated by RV0 is taken as a starting point, a successive selection of two 864-bit-data can cover information bits of 1736 bits, referring to FIG. 5, 864×2 data can also be selected successively, a version corresponding to the 864×2 data is RV0, the remaining two 864-bit-data can be selected successively, and can also be selected separately, FIG. 5 provides a schematic diagram of selecting separately.

Optionally, when the data is selected as above, the selection starting point is in the space where the information bits locate, specifically can be the position indicated by RV0, i.e. starting to select data from the position indicated by RV0.

Optionally, during an initial transmission, data starting from the position indicated by RV0 and being selected successively is transmitted, for example, the data of 864×4 bits as shown in FIG. 4, or the data of 864×2 bits as shown in FIG. 5, is transmitted in an initial transmission.

Step 33, transmit the selected data carried by the PUSCH using the bundled TTIs.

For example, when data of 864×4 bits is selected successively and there are 4 TTIs bundled, the data selected is divided into 4 parts, 864-bit-data of each part is transmitted within one TTI.

By means of using a TTI bundling manner, this embodiment can transmit more data within a shorter time delay, and reduce transmission delay; by means of using a relatively large TBS, Turbo coding gain can be made larger, header information and cyclic check (Cyclic Redundancy Check, CRC) overhead are reduced; by means of using a relatively small number of RBs, equivalent noise during a link calculation is made to maintain a relatively low level; mapping manners of the TTI bundling are modified, so that more information bits can be transmitted; by using QPSK modulation mode, a better link budget is provided in relative to 16 QAM and 64 QAM, thus a larger MCL can be obtained. Through the method described above, the coverage at the PUSCH medium data rate can be improved.

Figure 6:
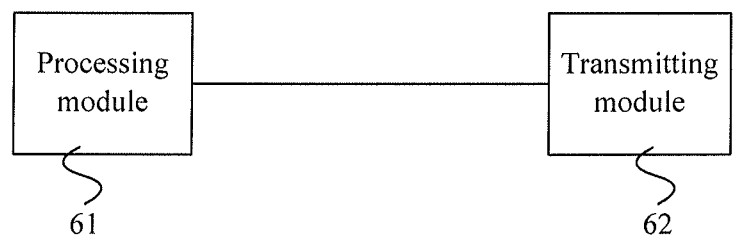
FIG. 6 is a schematic structural diagram of a device for data transmission according to an embodiment of the present invention.

FIG. 6 is a schematic structural diagram of a device for data transmission according to an embodiment of the present invention, the device can be a device implementing the described method, the device can be situated at a UE side, the device includes: a processing module 61 and a transmitting module 62; the processing module 61 is configured to select a TBS value according to a preconfigured second table, the second table is used for describing a corresponding relationship among a TBS value, the number of RBs and a TBS index, the number of the RBs corresponding to the selected TBS value is smaller than or equal to a specific value, the modulation mode corresponding to a TBS index which corresponds to a selected TBS value is QPSK, and the selected TBS value is capable of satisfying the rate requirement required during TTI bundling transmission; the transmitting module 62 is configured to transmit data using bundled TTIs according to the selected TBS value, where the data is carried by a PUSCH.

Optionally, the transmitting module can include:
a selecting unit, configured to select data carried by a PUSCH, where the data carried by the PUSCH includes all or part of information bits and the number of the information bits is the selected TBS value, when selecting the data carried by the PUSCH, start to select data within a storage location range of the information bits, and successively selecting all information bits starting from a selection starting point;
a transmitting unit, configured to transmit the selected data carried by the PUSCH using the bundled TTIs.

Optionally, the selecting unit is specifically configured to: successively and circularly select data that can be transmitted by the bundled TTIs.

Optionally, the selecting unit is specifically configured to: start to select data from a position indicated by RV0.

Optionally, the transmitting unit is specifically configured to: during an initial transmission, transmit consecutive data which starts to be selected from the position indicated by the RV0.

Optionally, the device can further include:
a storage module, configured to store the second table, where the TBS value, the number of the RBs and the TBS index described by the second table meet at least one of the following:

In the second table, when the number of the RBs is smaller than or equal to a specific value and the modulation mode corresponding to a TBS index is QPSK, a corresponding TBS value is obtained after amending a TBS value which corresponds to the same number of the RBs and the same TBS index in a first table, such that the amended TBS value is capable of satisfying the rate requirement required during TTI bundling transmission; or, In the second table, when the number of the RBs is smaller than or equal to a specific value and the TBS value is capable of satisfying the rate requirement required during TTI bundling transmission, the modulation mode corresponding to a corresponding TBS index is obtained after amending a modulation mode corresponding to a TBS index that corresponds to the same number of the RBs and the same TBS value in a first table, such that the amended modulation mode is QPSK; or, In the second table, when the modulation mode corresponding to a TBS index is QPSK and the TBS value is capable of satisfying the rate requirement required during TTI bundling transmission, the corresponding number of the RBs is greater than the maximum value of the number of RBs that can be selected in a first table during TTI bundling transmission;

The first table is an existing table used for describing the corresponding relationship among the TBS value, the number of the RBs and the TBS index.

Optionally, the TBS value selected by the processing module is any one of values within a range of [568,2152] and included in the first table.

Optionally, the number of the RBs corresponding to the TBS value selected by the processing module is smaller than or equal to 8.

This embodiment provides a second table as described above, the second table indicates that a TBS value therein is relatively large, a RB corresponding to a TBS is relatively small and a modulation mode corresponding to the TBS is QPSK, since the TBS value is relatively large, the requirement of a PUSCH at a medium rate can be satisfied, and a larger Turbo coding gain can be obtained and overhead can be reduced, a better MCL value can be obtained by using the relatively small RB and the QPSK, therefore, coverage at the PUSCH medium data rate can be improved by using the above ways.

Figure 7:
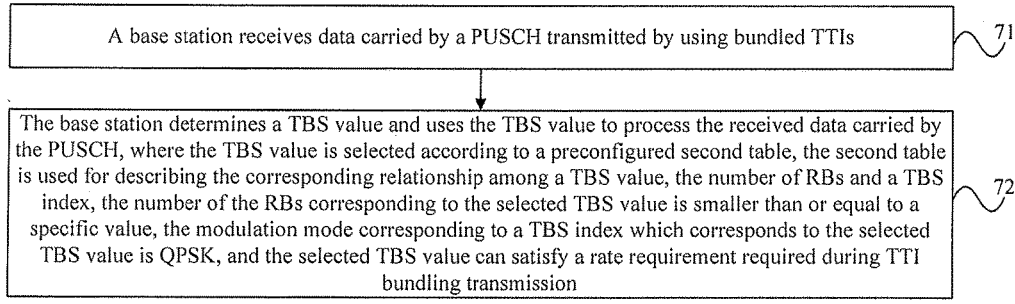
FIG. 7 is a schematic flow chart of a method for data transmission according to another embodiment of the present invention.

FIG. 7 is a schematic flow chart of a method for data transmission according to another embodiment of the present invention, including:

Step 71, a base station receives data carried by a PUSCH transmitted by using bundled TTIs;

Optionally, the base station can send configuration information to a UE firstly, indicate that the data carried by the PUSCH is transmitted by using the bundled TTIs, and then the base station receives the data carried by the PUSCH transmitted by the UE using the bundled TTIs.

Step 72, the base station determines a TBS value, and uses the TBS value to process the received data carried by the PUSCH, where the TBS value is selected according to a preconfigured second table, the second table is used for describing the corresponding relationship among a TBS value, the number of RBs and a TBS index, the number of the RBs corresponding to the selected TBS value is smaller than or equal to a specific value, the modulation mode corresponding to a TBS index which corresponds to the selected TBS value is QPSK, and the selected TBS value can satisfy a rate requirement required during TTI bundling transmission.

After receiving the data carried by the PUSCH, the base station can perform a processing such as demodulation, decoding, etc., where the decoding needs to be performed according to the TBS value.

Optionally, the TBS value, the number of the RBs and the TBS index described by the second table meet at least one of the following:

In the second table, when the number of the RBs is smaller than or equal to a specific value and the modulation mode corresponding to a TBS index is QPSK, a corresponding TBS value is obtained after amending a TBS value which corresponds to the same number of the RBs and the same TBS index in a first table, such that the amended TBS value can satisfy the rate requirement required during TTI bundling transmission; or, In the second table, when the number of the RBs is smaller than or equal to a specific value and the TBS value can satisfy the rate requirement required during TTI bundling transmission, the modulation mode corresponding to a corresponding TBS index is obtained after amending a modulation mode corresponding to a TBS index which corresponds to the same number of the RBs and the same TBS value in the first table, such that the amended modulation mode is QPSK; or, In the second table, when the modulation mode corresponding to a TBS index is QPSK and the TBS value can satisfy the rate requirement required during the TTI bundling transmission, the corresponding number of the RBs is greater than the maximum value of the number of the RBs that can be selected in the first table during TTI bundling transmission;

Where the first table is an existing table used for describing the corresponding relationship among the TBS value, the number of the RBs and the TBS index.

Optionally, the selected TBS value is any one of values within a range of [568,2152] and included in the first table.

Optionally, the specific value is 8.

This embodiment provides a second table as described above, the second table indicates that a TBS value therein is relatively large, a RB corresponding to a TBS is relatively small and a modulation mode corresponding to the TBS is QPSK, since the TBS value is relatively large, the requirement of a PUSCH at a medium rate can be satisfied, and a larger Turbo coding gain can be obtained and overhead can be reduced, a better MCL value can be obtained by using the relatively small RB and the QPSK, therefore, coverage at the PUSCH medium data rate can be improved by using the above ways.

Figure 8:
FIG. 8 is a schematic structural diagram of a device for data transmission according to another embodiment of the present invention.

FIG. 8 is a schematic structural diagram of a device for data transmission according to another embodiment of the present invention, the device can be a base station, the device includes a receiving module 81 and a processing module 82; the receiving module 81 is configured to receive data carried by a PUSCH transmitted by using bundled TTIs; the processing module 82 is configured to determine a TBS value, and use the TBS value to process the received data carried by the PUSCH, where the TBS value is selected according to a preconfigured second table, the second table is used for describing the corresponding relationship among a TBS value, the number of RBs and a TBS index, the number of the RBs corresponding to the selected TBS value is smaller than or equal to a specific value, the modulation mode corresponding to a TBS index which corresponds to the selected TBS value is QPSK, and the selected TBS value is capable of satisfying the rate requirement required during TTI bundling transmission.

Optionally, the TBS value, the number of the RBs and the TBS index described by the second table which are used by the processing module meet at least one of the following:

In the second table, when the number of RBs is smaller than or equal to a specific value and the modulation mode corresponding to a TBS index is QPSK, a corresponding TBS value is obtained after amending a TBS value which corresponds to the same number of the RBs and the same TBS index in a first table, such that the amended TBS value can satisfy the rate requirement required during TTI bundling transmission; or, In the second table, when the number of RBs is smaller than or equal to a specific value and a TBS value can satisfying the rate requirement required during TTI bundling transmission, the modulation mode corresponding to a corresponding TBS index is obtained after amending a modulation mode corresponding to a TBS index which corresponds to the same number of RBs and the same TBS value in the first table, such that the amended modulation mode is QPSK; or, In the second table, when the modulation mode corresponding to a TBS index is QPSK and the TBS value can satisfy the rate requirement required during TTI bundling transmission, the corresponding number of RBs is greater than the maximum value of the number of RBs that can be selected in the first table during TTI bundling transmission;

Where the first table is an existing table used for describing the corresponding relationship among the TBS value, the number of the RBs and the TBS index.

Optionally, the TBS value selected by the processing module is any one of values within a range of [568,2152] and included in the first table.

Optionally, the number of the RBs corresponding to the TBS value selected by the processing module is smaller than or equal to 8.

This embodiment provides a second table as described above, the second table indicates that a TBS value therein is relatively large, a RB corresponding to a TBS is relatively small and a modulation mode corresponding to the TBS is QPSK, since the TBS value is relatively large, the requirement of a PUSCH at a medium rate can be satisfied, and a larger Turbo coding gain can be obtained and overhead can be reduced, a better MCL value can be obtained by using the relatively small RB and the QPSK, therefore, coverage at the PUSCH medium data rate can be improved by using the above ways.

Figure 9:
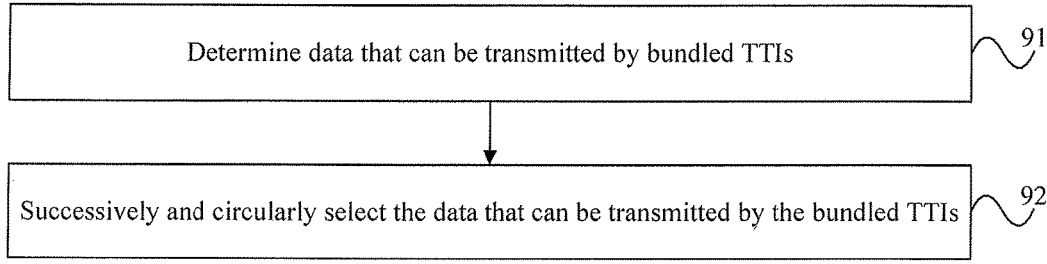
FIG. 9 is a schematic flow chart of a method for selecting data when TTIs are bundled according to an embodiment of the present invention.

FIG. 9 is a schematic flow chart of a method for selecting data when TTIs are bundled according to the present invention, including:

Step 91, determine data that can be transmitted by bundled TTIs;

Step 92, successively and circularly select the data that can be transmitted by the bundled TTIs.

For example, taking the number of bundled TTIs being 4 and data that can be transmitted by each TTI being 864 bits as an example, then the data that can be transmitted by the bundled TTIs is data of 864×4 bits. Thereafter, in a buffer used for buffering data, data of 864×4 bits is selected successively and circularly. Reference may be made to FIG. 4 for specific illustrations.

The data refers to bit-level data.

Optionally, the data is data carried by a PUSCH; optionally, the data carried by the PUSCH includes information bits, a selection starting point is within a storage location range where the information bits locate.

Optionally, the selection starting point of the successively and circularly selecting is a position indicated by RV0.

Optionally, can further include: during an initial transmission, transmit data that starts to be selected successively and circularly from the position indicated by the RV0.

Additionally, the present invention can also provide an embodiment, where the data selected successively is not all data that can be transmitted by the bundled TTIs, but data selected successively which can cover at least part of information bits, similar to FIG. 5, the at least part of the information bits refer to information bits starting from the selection starting point, i.e. an embodiment can also be provided:

start to select data within a storage location range of the information bits, and successively selecting all information bits starting from a selection starting point.

Figure 10:
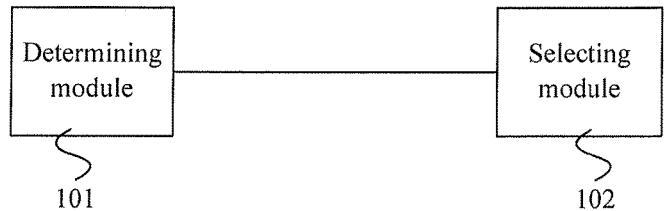
FIG. 10 is a schematic structural diagram of a device for selecting data when TTIs are bundled according to an embodiment of the present invention.

Correspondingly, the present invention also provides a device for selecting data when TTIs are bundled, the device can be located within a UE, with reference to FIG. 10, the device includes a determining module 101 and a selecting module 102; the determining module 101 is configured to determine data that can be transmitted by the bundled TTIs; the selecting module 102 is configured to successively and circularly select the data that can be transmitted by the bundled TTIs.

Optionally, the selection starting point of the successive and circular selecting by the selecting module is a position indicated by RV0.

Optionally, the device can further include: a transmitting module, configured to, during an initial transmission, transmit data selected successively and circularly starting from the position indicated by the RV0.

By means of successively selecting all information bits starting from a selection starting point, this embodiment can reduce the number of lost information bits.

In the embodiment described above, the data can be data carried by a PUSCH, when the selection starting point is the same as the starting point of the information bits, the data carried by the PUSCH includes all the information bits, when the selection starting point is after the starting point of information bits, the data carried by the PUSCH includes part of information bits, the part of the information bits refers to all information bits starting from the selection starting point. Furthermore, the number of the information bits is the selected TBS value.

Further, a channel coding will be performed before data transmission generally. The channel coding includes the following steps generally:

(1) cyclic redundancy check (CRC) addition: add a check block after a transport block. Typically, the check block is 24 bits, assuming that the transport block size is A bits, and is B bits after the CRC addition, then B=A+24;

(2) code block segmentation and code block CRC addition: if B>6144, then perform segmentation to the total B bits of transport block and the check block, and add a CRC check block of 24 bits to each code block then. Provided being segmented into C code blocks, then code blocks obtained can be denoted as: $c_{r0}, c_{r1}, c_{r2}, \ldots, c_{r(K_r-1)}$, where, r is the code block number, $K_r$ is the number of bits for the code block number r;

(3) coding, taking Turbo coding as an example: being performed for each code block, as for a code block whose number is r, encoded bits include three codestreams, denoted by: $d_{r0}^{(i)}, d_{r1}^{(i)}, d_{r2}^{(i)}, \ldots, d_{r(D_r-1)}^{(i)}$, i=0, 1, 2, $D_r$ is the number of bits on a codestream number i of a code block number r, $D_r=K_r+4$, where a codestream of i=0 includes information bits, and codestreams of i=1, 2 are redundancy bits added by the Turbo coding;

(4) rate matching: being performed for each code block, firstly perform subblock interleaving to the three codestreams of each code block, and then perform a bit selection and puncturing to the interleaved bits.

Figure 11:
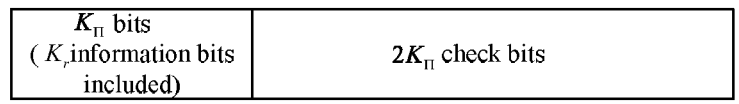
FIG. 11 is a schematic diagram of a bit buffer after subblock interleaving in the prior art.

When performing the subblock interleaving for three codestreams $d_{r0}^{(i)}, d_{r1}^{(i)}, d_{r2}^{(i)}, \ldots, d_{r(D_r-1)}^{(i)}$, i=0, 1, 2, design a matrix with $C_{subblock}^{TC}=32$ columns and $R_{subblock}^{TC}$ rows, where $R_{subblock}^{TC}$ is a minimum value satisfying $D_r \leq (R_{subblock}^{TC} \times C_{subblock}^{TC})$, write bits of each codestream to the matrix by rows, when bits of codestreams are insufficient, add dummy bits, perform a column permutation to the matrix, then read out bit streams by columns, the bit streams obtained are $v_0^{(i)}, v_1^{(i)}, v_2^{(i)}, \ldots, v_{r(K_\pi-1)}^{(i)}$, i=0, 1, 2, $K_\pi$ is the number of bits of each bit stream in the three bit streams of a code block after the subblock interleaving is performed, the stream of i=0 includes information bits. Put these three bit streams into a buffer, as for data carried by PUSCH, the size of the buffer is $N_{cb}=K_w=3\times K_\pi$, denote bits in the buffer as: $w_k$, k=0, 1, ..., $N_{cb}-1$; where, $w_j=v_j^{(0)}$, $w_{K_\pi+2j+1}=v_j^{(1)}$, $w_{K_\pi+2j+1}=v_j^{(2)}$, j=0, 1, ..., $K_\pi-1$. Thus, reference may be made to FIG. 11 for data alignment in the buffer, the first $K_\pi$ bits include $K_r$ information bits, and the following $2K_\pi$ bits are check bits.

Figure 12:
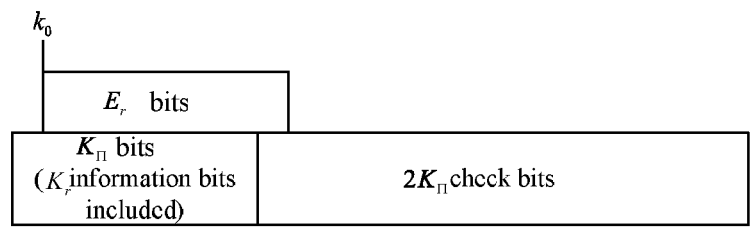
FIG. 12 is a schematic diagram of a process for bit selection and puncturing in the prior art.

A process for bit selection and puncturing is as follow: determining a starting position $k_0$ for the bit selection, and a rate matching output sequence length $E_r$, then with reference to FIG. 12, starting from $k_0$, to successively and circularly select $E_r$ bits in $w_k$, k=0, 1, ..., $N_{cb}-1$, and the selected bits are not dummy bits.

In one aspect, the rate matching output sequence length $E_r$ of the code block number r can be determined as follow:

if $r \leq C-\gamma-1$, then $E_r=N_L \times Q_m \times \lfloor G'/C \rfloor$, otherwise,
$E_r'=N_L \times Q_m \times \lceil G'/C \rceil$;

where, r is a code block number; C is the number of code blocks obtained during the code block segmentation; $\lfloor \ \rfloor$ indicates rounding down, $\lceil \ \rceil$ indicates rounding up.

$\gamma=G'$ mod C, the mod indicates modulo operation;

$G'=G/(N_L \times Q_m)$, G is the total number of bits available for transmission of a transport block within a subframe, i.e. indicating a resource that can be occupied by a transport block within a subframe in a bit level;

when using transmission diversity, $N_L=2$, in other situation, $N_L$ equals to the number of layers to which a transport block is mapped;

$Q_m$ is a value corresponding to the modulation mode, when the modulation mode is QPSK, $Q_m=2$; when the modulation mode is 16 QAM, $Q_m=4$; when the modulation mode is 64 QAM, $Q_m=6$.

In another aspect, the starting position $k_0$ for the bit selection can be determined using the following formula for calculation:

$$k_0 = R_{subblock}^{TC} \times \left(2 \times \left\lceil \frac{N_{cb}}{8R_{subblock}^{TC}} \right\rceil \times rv_{idx} + 2\right)$$

Where, $R_{subblock}^{TC}$ is the number of rows of a matrix used during the subblock interleaving; $N_{cb}$ is a size of the buffer for buffering the bit stream after the subblock interleaving; $rv_{idx}$ is a redundancy version number, a value taken by which can be: $rv_{idx}=0$, 1, 2 or 3.

For the code block with the sequence number being r, the bits obtained after the rate matching can be denoted as: $e_{r0}$, $e_{r1}, e_{r2}, \ldots, e_{r(E_r-1)}$.

(5) code block cascading: successively and sequentially connect bits of each code block which are obtained after the rate matching, to obtain final coding bits, where the number of the bits is G.

After the channel coding is completed, the G coding bits of a transport block are modulated, and then the modulated symbols are put onto a corresponding resource of a subframe for transmission.

In the prior art, transmission of data carried by a PUSCH can be configured to be performed by using bundled TTIs, a single transmission of a transport block occupies 4 subframes. During an initial transmission of the transport block, using 4 TTIs for bundling, a base station feedbacks whether data within these 4 TTIs is detected correctly via an acknowledgment (ACK) or negative acknowledgment (NACK) bit. If a UE receives a NACK feedback of the base station, retransmission of the transport block will be performed after 16 TTIs, the retransmission also uses 4 TTIs for bundling.

Figure 13:
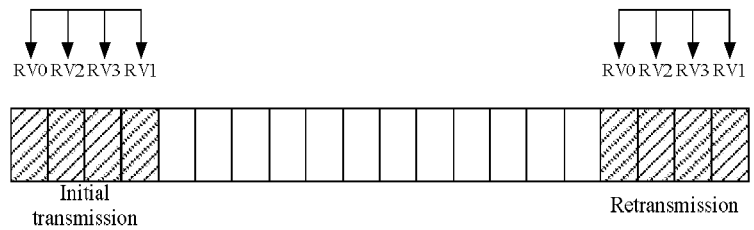
FIG. 13 is a schematic diagram of initial transmission and retransmission during bundled TTI transmission in the prior art.

In the prior art where data is transmitted using bundled TTIs, when a rate matching is performed, within 4 bundled subframes (or to be referred as TTIs), each subframe uses one redundancy version number for calculating $k_0$, the 4 subframes can use different redundancy versions, e.g., $rv_{idx}$ is 0, 2, 3, 1 in turn, reference may be made to FIG. 13 for a schematic diagram of an FDD system, when data is transmitted using bundled TTIs, each TTI in the bundled TTIs corresponds to different redundancy version number.

Figure 14:
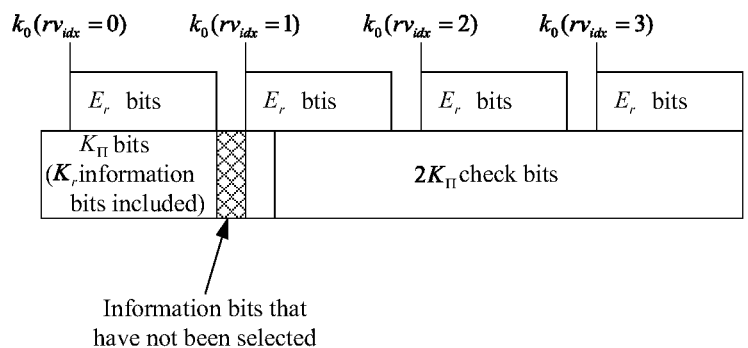
FIG. 14 is a schematic diagram of a process for bit selection and puncturing when bundled TTI transmission uses a TBS in a second table in the prior art.

As described in the above embodiment, when data carried by a PUSCH is transmitted using bundled TTIs, the size of a transport block is a TBS selected according to a second table, in the second table a TBS value is relatively large, a RB corresponding to a TBS is relatively small and a modulation mode corresponding to the TBS is QPSK, at this time, when $rv_{idx}=0$, $k_0(rv_{idx}=0)=R_{subblock}^{TC} \times 2$, $k_0(rv_{idx}=0)+E_r<K_{\pi}$, and when $rv_{idx}=1$, $k_0(rv_{idx}=1)>k_0(rv_{idx}=0)+E_r$. That is to say, with reference to FIG. 14, information bits included between $w_{k_0(rv_{idx}=0)+E_r}$ and $w_{k_0(rv_{idx}=1)}$ in the buffer have not been selected, and thus cannot be transmitted, resulting in a loss of information bits.

In order to reduce the loss of information bits, the present invention also provides the following embodiment.

In embodiments of the present invention, when selecting bits, successively select all information bits starting from a selection starting point, it also can be said to successively and circularly select bits that can be transmitted by bundled TTIs. Specifically, modification can be made to the rate matching and the code block cascading during an existing chanel coding. It can be understood, in order to correspond to the above embodiments, selecting bits can also be referred to as selecting data, one bit is one bit of data, the data is 0 or 1.

Figure 15:
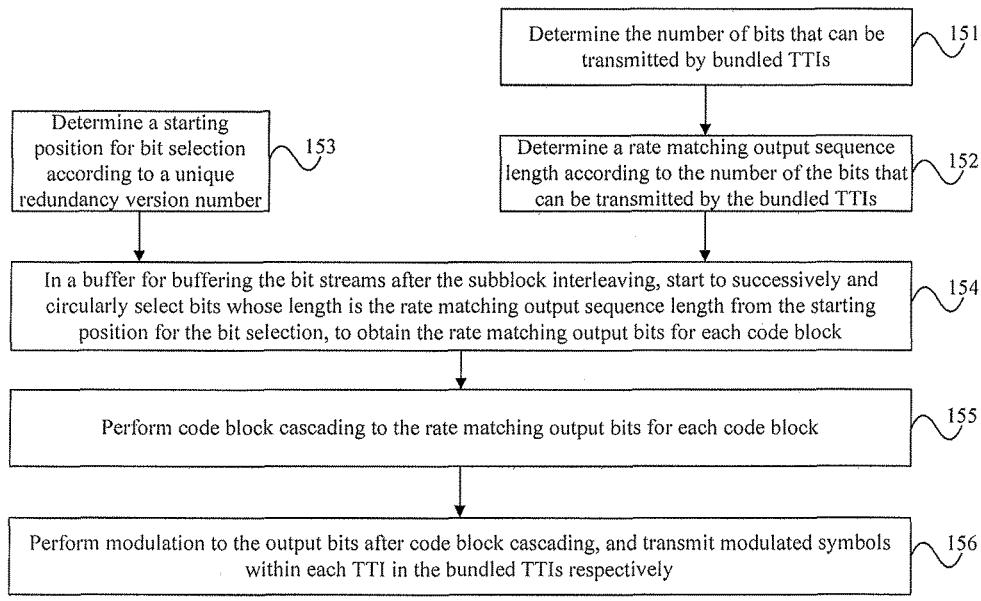
FIG. 15 is a schematic flow chart of a method for transmitting bits according to an embodiment of the present invention.

With reference to FIG. 15, the present invention providing an embodiment as follow, including:

Step 151, determine the number of bits that can be transmitted by bundled TTIs;

The number of the bits that can be transmitted by the bundled TTIs is represented by H, $H=G \times N$; as described above, G is the total number of bits available for transmission of a transport block within a subframe, N is the number of TTIs in a bundle, for example, N=4.

Different from the prior art where G is determined corresponding to each TTI, H determined in this embodiment is corresponding to the bundled TTIs, H is the total number of bits available for transmission of a transport block within N bundled TTIs, i.e. indicating a resource that can be occupied by a transport block within N bundled TTIs at a bit level.

Step 152, determine a rate matching output sequence length according to the number of the bits that can be transmitted by the bundled TTIs;

Step 153, determine a starting position for bit selection according to a unique redundancy version number.

Different from the prior art, when determining the sequence length as described above, G is used in the prior art, while H is used in this embodiment; when determining the starting position $k_0$ as described above, one starting position is determined for each TTI in the prior art, while one starting position is determined for N bundled TTIs in this embodiment.

Specifically, in this embodiment, the rate matching output sequence length $E_r'$ of the code block number r can be determined as follow:

if $r \le C-\gamma-1$, then $E_r'=N_L \times Q_m \times \lfloor G'/C \rfloor$, otherwise, $E_r'=N_L \times Q_m \times \lceil G'/C \rceil$;

where, r is a code block number; C is the number of code blocks obtained during code block segmentation; $\lfloor\ \rfloor$ indicates rounding down, $\lceil\ \rceil$ indicates rounding up.

$\gamma=G'$ mod C, where the mod indicates modulo operation; $G'=H/(N_L \times Q_m)$, where H is the total number of bits available for transmission of a transport block within N bundled TTIs, i.e. indicating a resource that can be occupied by a transport block within N bundled TTIs in a bit level;

When using transmission diversity, $N_L=2$, in other situation, $N_L$ equals to the number of layers to which a transport block is mapped;

$Q_m$ is a value corresponding to the modulation mode, when the modulation mode is QPSK, $Q_m=2$; when the modulation mode is 16 QAM, $Q_m=4$; when the modulation mode is 64 QAM, $Q_m=6$.

In this embodiment, the starting position $k_0$ for the bit selection can be determined using the following formula for calculation:

$$k_0 = R_{subblock}^{TC} \times \left(2 \times \left\lceil \frac{N_{cb}}{8R_{subblock}^{TC}} \right\rceil \times rv_{idx} + 2\right)$$

where, $R_{subblock}^{TC}$ is the number of rows of a matrix used during subblock interleaving; $N_{cb}$ is a size of a buffer for buffering a bit stream that is obtained after the subblock interleaving; $rv_{idx}$ is a redundancy version number, a value taken by which can be: $rv_{idx}$=0, 1, 2 or 3. Optionally, during an initial transmission of the bundled TTIs, $rv_{idx}$ is selected as 0, during a retransmission, $k_0$ can be calculated according to an order of $rv_{idx}$=2, 3, 1, 0, 2, 3, 1, . . . .

Step 154, in the buffer for buffering the bit streams after the subblock interleaving, start to successively and circularly select bits whose length is the rate matching output sequence length from the starting position for the bit selection, to obtain the rate matching output bits for each code block.

Figure 16:
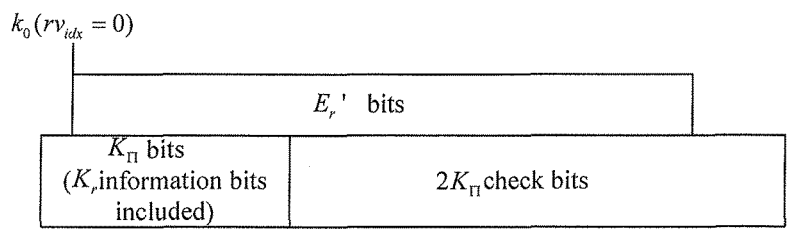
FIG. 16 is a schematic diagram of a process for bit selection and puncturing during bundled TTI transmission according to an embodiment of the present invention.

As shown in FIG. 16, in the buffer $w_k$, k=0, 1, . . . , $N_{cb}$−1, during an initial transmission, starting to from $k_0(rv_{idx}$=0), successively and circularly select $E_r'$ bits, where $E_r'$ is calculated according to H The bits selected in the step 154 are the rate matching output bits for each code block then, as for the code block number r, the rate matching output bits obtained can be denoted as: $e_{r0}, e_{r1}, e_{r2}, \ldots, e_{r(E_r'-1)}$, where $E_r'$ is calculated according to H.

Optionally, corresponding to the described embodiments, the bit streams after subblock interleaving are: bit streams obtained after performing the subblock interleaving to codestreams that are obtained after performing CRC addition, code block segmentation and code block CRC addition as well as Turbo coding to information bits the number of which is a TBS selected according to a second table.

Step 155, perform code block cascading to the rate matching output bits for each code block;

Where, during the code block cascading, the rate matching output bits for each code block are successively and sequentially connected, to obtain final coding bits of a transport block with the number of the coding bits being H.

Step 156, perform modulation to the output bits after code block cascading, and transmit modulated symbols within each TTI in the bundled TTIs respectively.

The number of the bits after the code block cascading is H, then each TTI transmits the modulated symbols corresponding to H/N bits.

Figure 17:
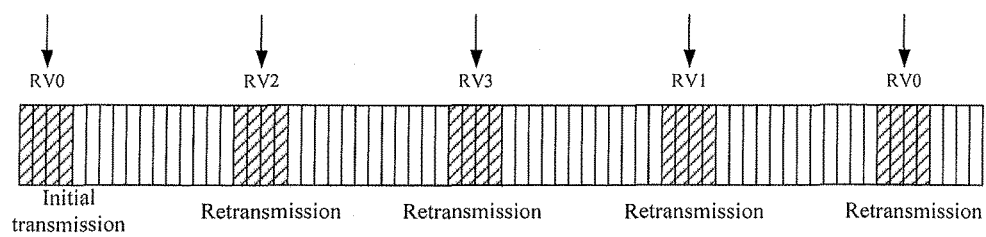
FIG. 17 is a schematic diagram of initial transmission and retransmission during bundled TTI transmission according to an embodiment of the present invention.

Furthermore, during a retransmission, a starting position of bundled TTIs also corresponds to one redundancy version only, with reference to FIG. 17, during the retransmission, a starting position of N bundled TTIs is determined according to $rv_{idx}$=2, $rv_{idx}$=3, $rv_{idx}$=1 or $rv_{idx}$=0.

By modifying existing process of rate matching and code block cascading according to the above processes, this embodiment can reduce a loss of information bits, thereby transmitting more information bits.

Figure 18:
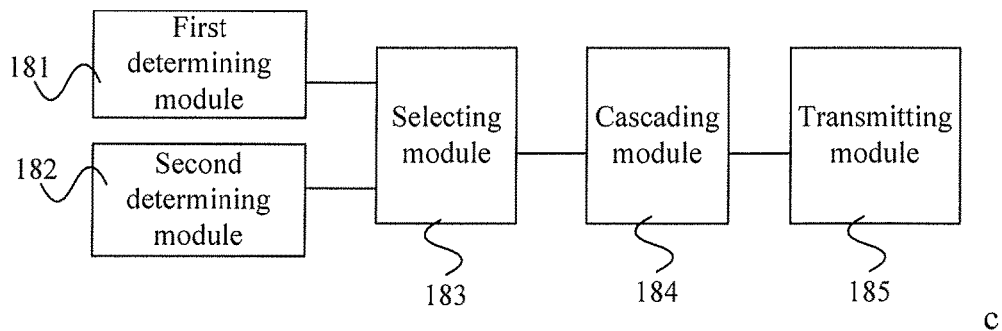
FIG. 18 is a schematic structural diagram of a device for transmitting bits according to an embodiment of the present invention.

FIG. 18 is a schematic structural diagram of a device for transmitting bits according to an embodiment of the present invention, the device can be located at a UE side, the device includes a first determining module 181, a second determining module 182, a selecting module 183, a cascading module 184 and a transmitting module 185; the first determining module 181 is configured to determine the number of bits that can be transmitted by bundled TTIs, and determine a rate matching output sequence length according to the number of the bits that can be transmitted by the bundled TTIs; the second determining module 182 is configured to determine a starting position for bit selection according to a unique redundancy version number; the selecting module 183 is configured to, in a buffer for buffering bit streams after subblock interleaving, start successively and circularly select bits whose length is the rate matching output sequence length from the starting position for the bit selection; the cascading module 184 is configured to perform code block cascading to bits after each code block is rate-matched; the transmitting module 185 is configured to perform modulation to the code block-cascaded bits, and transmit modulated symbols within each TTI of the bundled TTIs respectively.

Optionally, during an initial transmission, the unique redundancy version number used by the second determining module is 0; or, during a retransmission, the unique redundancy version number used by the second determining module is 0, 1, 2 or 3.

Optionally, a computation formula for the first determining module to determine the number of bits that can be transmitted by the bundled TTIs is:

$H = G \times N$, where,

H is the number of bits that can be transmitted by the bundled TTIs;
G is the total number of bits available for transmission of a transport block within a TTI;
N is the number of the bundled TTIs.

Optionally, a computation formula for the first determining module to determine a rate matching output sequence length according to the bits that can be transmitted by the bundled TTIs is:

if $r \leq C-\gamma-1$, then $E_r' = N_L \times Q_m \times \lfloor G'/C \rfloor$, otherwise,
$E_r' = N_L \times Q_m \times \lceil G'/C \rceil$;

where, $E_r'$ is the length of the sequence;
r is a code block number; C is the number of code blocks obtained during the code block segmentation; $\lfloor \ \rfloor$ indicates rounding down, $\lceil \ \rceil$ indicates rounding up;
$\gamma = G'$ mod C, the mod indicates modulo operation;
$G' = H/(N_L \times Q_m)$, H is the number of bits that can be transmitted by the bundled TTIs;
For transmission diversity, $N_L$=2, otherwise, $N_L$ equals to the number of layers to which a transport block is mapped;
$Q_m$ is a value corresponding to the modulation mode.

Optionally, a computation formula for the second determining module to determine a starting position for bit selection according to an unique redundancy version number is:

$$k_0 = R_{subblock}^{TC} \times \left(2 \times \left\lceil \frac{N_{cb}}{8R_{subblock}^{TC}} \right\rceil \times rv_{idx} + 2\right)$$

where, $k_0$ is the starting position;
$R_{subblock}^{TC}$ is the number of rows of a matrix used during subblock interleaving;
$N_{cb}$ is a size of a buffer for buffering a bit stream after the subblocks are interleaved;
$rv_{idx}$ is the unique redundancy version number.

Optionally, the transmitting module is specifically configured to:
transmit modulated symbols corresponding to H/N bits within each TTI, H is the data that can be transmitted by the bundled TTIs, N is the number of the bundled TTIs.

Figure 19:
FIG. 19 is a schematic structural diagram of a UE according to an embodiment of the present invention.

FIG. 19 is a schematic structural diagram of a UE according to an embodiment of the present invention, including a processor 191 and a transmitter 192, the processor 191 is configured to select a transport block size TBS value according to a preconfigured second table, where the second table is used for describing a corresponding relationship among a TBS value, the number of resource blocks RBs and a TBS index, the number of the RBs corresponding to the selected TBS value is smaller than or equal to a specific value, the modulation mode corresponding to a TBS index which corresponds to the selected TBS value is quadrature phase shift keying QPSK, and the selected TBS value can satisfy the rate requirement required during transmission time interval TTI bundling transmission; and the transmitter 192 is configured to transmit data carried by a physical uplink shared channel PUSCH using bundled TTIs according to the selected TBS value.

Optionally, the processor is specifically configured to:

select data carried by the PUSCH, where the data carried by the PUSCH includes all or part of information bits, the number of the information bits is the selected TBS value, when selecting the data carried by the PUSCH, start to select data within a storage location range of the information bits, and successively select all information bits starting from a selection starting point;

transmit the selected data carried by the PUSCH using the bundled TTIs.

Optionally, the processor is specifically configured to:

successively and circularly select data that can be transmitted by the bundled TTIs.

Optionally, the processor is specifically configured to determine a position indicated by RV0 as the selection starting point.

Optionally, the transmitter is specifically configured to:

during an initial transmission, transmit consecutive data which starts to be selected from the position indicated by the RV0.

Optionally, the TBS value, the number of the RBs and the TBS index described by the second table used by the processor meet at least one of the following:

In the second table, when the number of the RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value can satisfy the rate requirement required during TTI bundling transmission; or, In the second table, when the number of the RBs is smaller than or equal to a specific value and the TBS value can satisfy the rate requirement required during TTI bundling transmission, the modulation mode corresponding to a corresponding TBS index is obtained after amending a modulation mode corresponding to a TBS index which corresponds to the same number of RBs and the same TBS value in the first table, such that the amended modulation mode is QPSK; or, In the second table, when the modulation mode corresponding to a TBS index is QPSK and the TBS value can satisfy the rate requirement required during TTI bundling transmission, the corresponding number of RBs is greater than the maximum value of the number of RBs that can be selected in the first table during TTI bundling transmission;

Where the first table is an existing table used for describing the corresponding relationship among the TBS value, the number of the RBs and the TBS index.

Optionally, the TBS value selected by the processor is any one of values within a range of [568,2152] and included in the first table.

Optionally, the specific value in the second table used by the processor is 8.

Optionally, the data carried by the PUSCH is rate matching output data for each code block, the processor is specifically configured to:

determine data that can be transmitted by the bundled TTIs;

determine a rate matching output sequence length according to the data that can be transmitted by the bundled TTIs, and determine a starting position for data selection according to a unique redundancy version number;

in a buffer for buffering a data stream after subblock interleaving, start to successively and circularly select data whose length is the rate matching output sequence length from the starting position for the data selection, obtain the rate matching output data for each code block, where the data stream after the subblock interleaving is a data stream obtained after performing the subblock interleaving to a codestream that is obtained after performing CRC addition, code block segmentation, code block CRC addition and coding to the information data;

perform code block cascading to the data with each code block is rate-matched;

perform modulation to the code block-cascaded data;

the transmitter is specifically configured to:

transmit modulated symbols within each TTI of the bundled TTIs respectively.

Optionally, during an initial transmission, the unique redundancy version number used by the processor is 0; or, during a retransmission, the unique redundancy version number used by the processor is 0, 1, 2 or 3.

Optionally, a computation formula for the processor to determine the data that can be transmitted by the bundled TTIs is:

$$H = G \times N, \text{ where,}$$

H is the data that can be transmitted by the bundled TTIs;

G is the total number of data available for transmission of a transport block within a TTI;

N is the number of the bundled TTIs.

Optionally, a computation formula for the processor to determine the rate matching output sequence length according to the data that can be transmitted by the bundled TTIs is:

$$\text{if } r \leq C-\gamma-1, \text{ then } E_r' = N_L \times Q_m \times \lfloor G'/C \rfloor, \text{ otherwise,}$$
$$E_r' = N_L \times Q_m \times \lceil G'/C \rceil;$$

where, $E_r'$ is the length of the sequence;

r is a code block number; C is the number of code blocks obtained during code block segmentation; $\lfloor \ \rfloor$ indicates rounding down, $\lceil \ \rceil$ indicates rounding up;

$\gamma = G'$ mod C, the mod indicates modulo operation;

$G' = H/(N_L \times Q_m)$, H is the data that can be transmitted by the bundled TTIs;

when using transmission diversity, $N_L = 2$, in other situation, $N_L$ equals to the number of layers to which a transport block is mapped;

$Q_m$ is a value corresponding to the modulation mode.

Optionally, a computation formula for the processor to determine the starting position for bit selection according to a unique redundancy version number is:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during the subblock interleaving;

$N_{cb}$ is a size of a buffer for buffering a bit stream after the subblock interleaving;

$rv_{idx}$ is the unique redundancy version number.

Optionally, the transmitter is specifically configured to transmit modulated symbols corresponding to H/N bits within each TTI, H is the data that can be transmitted by the bundled TTIs, N is the number of the bundled TTIs.

Figure 20:
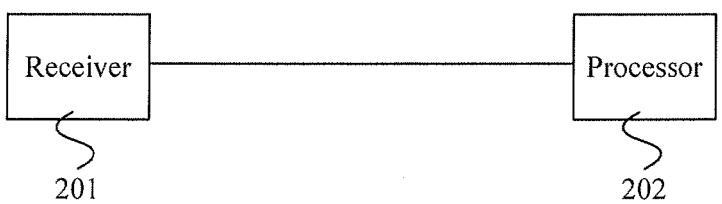
FIG. 20 is a schematic structural diagram of a base station according to an embodiment of the present invention.

FIG. 20 is a schematic structural diagram of a base station according to an embodiment of the present invention, including a receiver 201 and a processor 202; the receiver 201 is configured to receive data carried by a physical uplink shared channel PUSCH transmitted by using bundled transmission time intervals TTIs; the processor 202 is configured to determine a transport block size TBS value, and use the TBS value to process the received data carried by the PUSCH, where the TBS value is selected according to a preconfigured second table, the second table is used for describing a corresponding relationship among a TBS value, the number of RBs and a TBS index, the number of the RBs corresponding to the selected TBS value is smaller than or equal to a specific value, the modulation mode corresponding to a TBS index which corresponds to the selected TBS value is quadrature phase shift keying QPSK, and the selected TBS value is capable of satisfying a rate requirement required during TTI bundling transmission.

Optionally, the TBS value, the number of the RBs and the TBS index described in the second table used by the processor meet at least one of the following:

in the second table, when the number of the RBs is smaller than or equal to a specific value and the modulation mode corresponding to a TBS index is QPSK, a corresponding TBS value is obtained after amending a TBS value which corresponds to the same number of RBs and the same TBS index in a first table, such that the amended TBS value can satisfy the rate requirement required during TTI bundling transmission; or, in the second table, when the number of the RBs is smaller than or equal to a specific value and the TBS value can satisfy the rate requirement required during TTI bundling transmission, the modulation mode corresponding to a corresponding TBS index is obtained after amending a modulation mode corresponding to a TBS index which corresponds to the same number of RBs and the same TBS value in the first table, such that the amended modulation mode is QPSK; or, in the second table, when the modulation mode corresponding to a TBS index is QPSK and the TBS value can satisfy the rate requirement required during TTI bundling transmission, the corresponding number of RBs is greater than the maximum value of the number of RBs that can be selected in the first table during TTI bundling transmission;

where the first table is an existing table used for describing the corresponding relationship among the TBS value, the number of the RBs and the TBS index.

Optionally, the selected TBS value selected by the processor is any one of values within a range of [568,2152] and included in the first table.

Optionally, the specific value in the second table used by the processor is 8.

Figure 21:
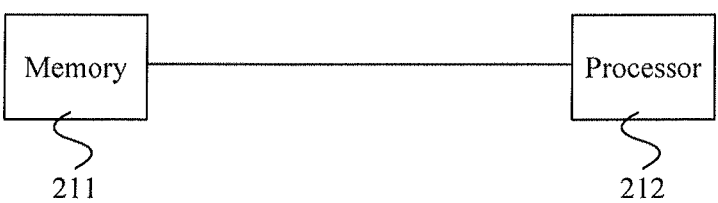
FIG. 21 is a schematic structural diagram of a UE according to another embodiment of the present invention.

FIG. 21 is a schematic structural diagram of a UE according to another embodiment of the present invention, including a memory 211 and a processor 212; the memory 211 is configured to store data; the processor 212 is configured to determine data that can be transmitted by bundled TTIs, and successively and circularly select in the memory the data that can be transmitted by the bundled TTIs.

Optionally, the processor is specifically configured to: a selection starting point of successively and circularly selecting is a position indicated by RV0.

Optionally, the data is data carried by a physical uplink shared channel PUSCH, the base station further includes: a transmitter, configured to, during an initial transmission, transmit data which starts to be selected successively and circularly from the position indicated by the RV0.

Optionally, the memory is specifically configured to buffering a data stream after subblock interleaving; the processor is specifically configured to: determine a rate matching output sequence length according to the number of the data that can be transmitted by the bundled TTIs; determine a starting position for data selection according to a unique redundancy version number; and in the memory, start to successively and circularly select data whose length is the rate matching output sequence length from the starting position for the data selection.

Optionally, during an initial transmission, the unique redundancy version number used by the processor is 0; or, during a retransmission, the unique redundancy version number used by the processor is 0, 1, 2 or 3.

Optionally, a computation formula for the processor to determine the rate matching output sequence length according to the data that can be transmitted by the bundled TTIs is:

if $r \leq C-\gamma-1$, then $E_r' = N_L \times Q_m \times \lfloor G'/C \rfloor$, otherwise, $E_r' = N_L \times Q_m \times \lceil G'/C \rceil$;

where, $E_r'$ is the length of the sequence;
r is a code block number; C is the number of code blocks obtained during code block segmentation; $\lfloor \ \rfloor$ indicates rounding down, $\lceil \ \rceil$ indicates rounding up;
$\gamma = G'$ mod C, where the mod indicates modulo operation;
$G' = H/(N_L \times Q_m)$, where H is the data that can be transmitted by the bundled TTIs;
when using transmission diversity, $N_L=2$, in other situations, $N_L$ equals to the number of layers to which a transport block is mapped;
$Q_m$ is a value corresponding to the modulation mode;
where, a computation formula of H is:

$H = G \times N$,

G is the total number of data available for transmission of a transport block within a TTI;
N is the number of the bundled TTIs.

Optionally, a computation formula for the processor to determine the starting position for data selection according to a unique redundancy version number is:

$$k_0 = R_{subblock}^{TC} \times \left(2 \times \left\lceil \frac{N_{cb}}{8R_{subblock}^{TC}} \right\rceil \times rv_{idx} + 2\right)$$

where, $k_0$ is the starting position;
$R_{subblock}^{TC}$ is the number of rows of a matrix used during subblock interleaving;
$N_{cb}$ is a size of a buffer for buffering a bit stream after the subblock interleaving
$rv_{idx}$ is the unique redundancy version number.

Figure 22:
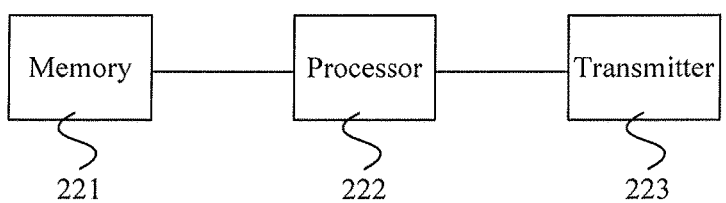
FIG. 22 is a schematic structural diagram of a UE according to another embodiment of the present invention.

FIG. 22 is a schematic structural diagram of a UE according to another embodiment of the present invention, including a memory 221, a processor 222 and a transmitter 223; the memory 221 is configured to store a bit stream after subblock interleaving; the processor 222 is configured to determine the number of bits that can be transmitted by bundled TTIs; determine a rate matching output sequence length according to the number of the bits that can be transmitted by the bundled TTIs; determine a starting position for bit selection according to a unique redundancy version number; in the memory, start to successively and circularly select bits whose length is the rate matching output sequence length from the starting position for the bit selection, obtain bits after each code block is rate-matched; perform code block cascading to the bits after each code block is rate-matched; perform a modulation to the code block-cascaded bits; the transmitter 223 is configured to transmit modulated symbols within each TTI in the bundled TTIs respectively.

Optionally, during an initial transmission, the unique redundancy version number used by the processor is 0; or, during a retransmission, the unique redundancy version number used by the processor is 0, 1, 2 or 3.

Optionally, a computation formula for the processor to determine the number of bits that can be transmitted by the bundled TTIs is:

$H = G \times N$, where,

H is the number of bits that can be transmitted by the bundled TTIs;

G is the total number of bits available for transmission of a transport block within a TTI;

N is the number of the bundled TTIs.

Optionally, a computation formula for the processor to determine the rate matching output sequence length according to the number of bits that can be transmitted by the bundled TTIs is:

if $r \leq C - \gamma - 1$, then $E_r' = N_L \times Q_m \times \lfloor G'/C \rfloor$, otherwise, $E_r' = N_L \times Q_m \times \lceil G'/C \rceil$;

where, $E_r'$ is the sequence length;

r is a code block number; C is the number of code blocks obtained during code block segmentation; $\lfloor \ \rfloor$ indicates rounding down, $\lceil \ \rceil$ indicates rounding up;

$\gamma = G'$ mod C, where the mod indicates modulo operation; $G' = H/(N_L \times Q_m)$, where H is the bits that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

Optionally, a computation formula for the processor to determine the starting position for the bit selection according to a unique redundancy version number is:

$$k_0 = R_{subblock}^{TC} \times \left(2 \times \left\lceil \frac{N_{cb}}{8 R_{subblock}^{TC}} \right\rceil \times rv_{idx} + 2\right)$$

where, $k_0$ is the starting position;

$R_{subblock}^{TC}$ is the number of rows of a matrix used during subblock interleaving;

$N_{cb}$ is a size of a buffer for buffering a bit stream after the subblock interleaving;

$rv_{idx}$ is the unique redundancy version number.

Optionally, the transmitter is specifically configured to: transmit modulated symbols corresponding to H/N bits within each TTI, where H is the data that can be transmitted by the bundled TTIs, and N is the number of the bundled TTIs.

Figure 23:
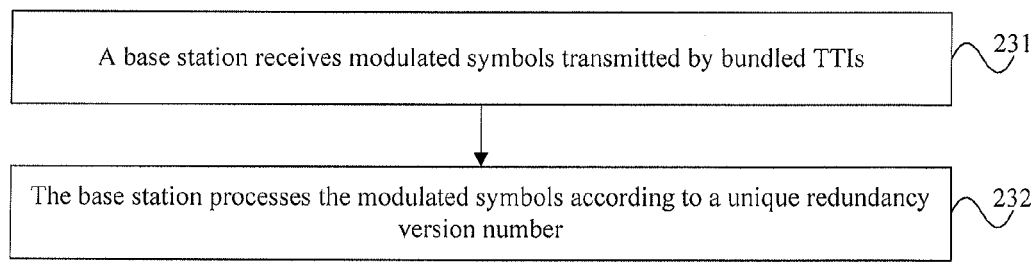
FIG. 23 is a schematic flow chart of a method for receiving bits according to an embodiment of the present invention.

FIG. 23 is a schematic flow chart of a method for receiving bits according to an embodiment of the present invention, including:

Step 231, a base station receives modulated symbols transmitted by bundled TTIs;

Step 232, the base station processes the modulated symbols according to a unique redundancy version number.

Optionally, in step 232, the base station processing the modulated symbols specifically includes:

demodulation processing, to obtain a demodulated bit stream;

according to a calculated rate matching output sequence length $E_r'$ of a code block number r, selecting a bit stream of the code block r from the demodulated bit stream, $1 \leq r \leq C$. Method for computing the rate matching output sequence length $E_r'$ is described in detail in other embodiments of the present invention; a same computing method is used herein, and thus the details will not be repeated;

calculating a starting position $k_0$ according to the unique redundancy version number, putting the bit stream of the code block r in a buffer, starting to put in from the position $k_0$ of the buffer. Method for computing the starting position $k_0$ is described in detail in other embodiments of the present invention; a same computing method is used herein, and thus the details will not be repeated. During an initial transmission, the unique redundancy version number used by the processor is 0; or, during a retransmission, the unique redundancy version number is 0, 1, 2 or 3;

performing subblock de-interleaving to the bits in the buffer;

according to a TBS in the second table, calculating the number of information bits included in the code block r, according to the number of the information bits included in the code block r, decoding the subblock-deinterleaved bits, to obtain the information bits of the code block r;

after processing all C code blocks, obtaining information bits the number of which is the TBS in the second table.

Figure 24:
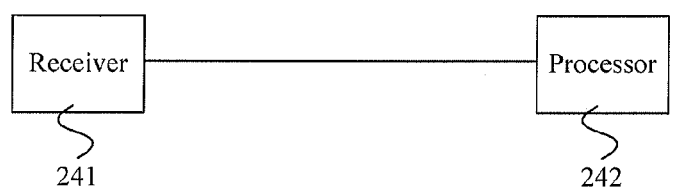
FIG. 24 is a schematic structural diagram of a base station according to another embodiment of the present invention.

FIG. 24 is a schematic structural diagram of a base station according to another embodiment of the present invention, including a receiver 241 and a processor 242; the receiver 241 is configured to receive modulated symbols transmitted by bundled TTIs and send the modulated symbols to the processor; the processor 242 is configured to process the modulated symbols according to a unique redundancy version number.

Optionally, the processor processing the modulated symbols specifically includes:

demodulation processing, to obtain a demodulated bit stream;

according to a calculated rate matching output sequence length $E_r'$ of a code block number r, selecting a bit stream of the code block r from the demodulated bit stream, $1 \leq r \leq C$. The method for computing the length $E_r'$ of the rate matching output sequence is described in detail in other embodiments of the present invention; a same computing method is used herein, and thus the details will not be repeated;

calculating a starting position $k_0$ according to a unique redundancy version number, putting the bit stream of the code block r in a buffer, starting to put in from the position $k_0$ of the buffer. The method for computing the starting position $k_0$ is described in detail in other embodiments of the present invention; a same computing method is used herein, and thus the details will not be repeated. During an initial transmission, the unique redundancy version number used by the processor is 0; or, during a retransmission, the unique redundancy version number is 0, 1, 2 or 3;

performing subblock de-interleaving to the bits in the buffer;

according to a TBS in the second table, calculating the number of information bits included in the code block r, according to the number of the information bits included in the code block r, decoding the subblock-deinterleaved bits, and obtaining the information bits of the code block r;

after processing all C code blocks, obtaining information bits the number of which is the TBS in the second table.

Persons of ordinary skill in the art may understand that, all or a part of the steps of the foregoing method embodiments may be implemented by a program instructing relevant hardware. The foregoing program may be stored in a computer readable storage medium. When the program is executed, the steps of the foregoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the nature of corresponding technical solutions depart from the scope of the technical solutions in the embodiments of the present invention.

What is claimed is:

1. A method for transmitting bits, which is used for reducing loss of information bits, comprising:
   determining the number of bits that can be transmitted by bundled transmission time intervals (TTIs), and determining a rate matching output sequence length according to the number of the bits that can be transmitted by the bundled TTIs;
   determining a starting position for bit selection according to a unique redundancy version number, wherein during an initial transmission, the unique redundancy version number is 0; or, during a retransmission, the unique redundancy version number is 0, 1, 2 or 3;
   in a buffer for buffering a bit stream after subblock interleaving, starting to successively and circularly select bits whose length is the rate matching output sequence length from the starting position for the bit selection, and obtaining the rate matching output bits for each code block, wherein the bit stream after the subblock interleaving is a bit stream obtained after performing the subblock interleaving to a codestream that is obtained after performing cyclic redundancy check (CRC) addition, code block segmentation, code block CRC addition and coding to the information bits;
   performing code block cascading to the rate matching output bits for each code block;
   performing modulation to the code block-cascaded bits, and transmitting modulated symbols within each TTI of the bundled TTIs respectively.

2. The method according to claim 1, wherein the determining the number of bits that can be transmitted by the bundled TTIs comprises: determining the number of the bits that can be transmitted by the bundled TTIs according to a following computation formula:

$H = G \times N$, wherein,

H is the number of bits that can be transmitted by the bundled TTIs;
G is the total number of bits available for transmission of a transport block within a TTI;
N is the number of TTIs in a bundle.

3. The method according to claim 1, wherein the determining the rate matching output sequence length according to the number of bits that can be transmitted by the bundled TTIs comprises: determining the rate matching output sequence length according to a following computation formula:

if $r \leq C-\gamma-1$, then $E_r' = N_L \times Q_m \times \lfloor G'/C \rfloor$, otherwise,
$E_r' = N_L \times Q_m \times \lceil G'/C \rceil$;

where, $E_r'$ is the rate matching output sequence length;
r is a code block number; C is the number of code blocks obtained during code block segmentation; $\lfloor \ \rfloor$ indicates rounding down, $\lceil \ \rceil$ indicates rounding up;
$\gamma = G'$ mod C, wherein the mod indicates modulo operation;
$G' = H/(N_L \times Q_m)$, wherein H is the number of bits that can be transmitted by the bundled TTIs;
for transmission diversity, $N_L = 2$, otherwise, $N_L$ is equal to the number of layers a transport block is mapped onto;
$Q_m$ is a value corresponding to the modulation mode.

4. The method according to claim 1, wherein, the determining the starting position for the bit selection according to the unique redundancy version number comprises:
determining the starting position for the bit selection according to a following computation formula:

$$k_0 = R_{subblock}^{TC} \times \left( 2 \times \left\lceil \frac{N_{cb}}{8 R_{subblock}^{TC}} \right\rceil \times rv_{idx} + 2 \right)$$

wherein, $k_0$ is the starting position;
$R_{subblock}^{TC}$ is the number of rows of a matrix used during subblock interleaving;
$N_{cb}$ is a size of the buffer for buffer the bit stream after the subblock interleaving;
$rv_{idx}$ is the unique redundancy version number.

5. The method according to claim 1, wherein the transmitting the modulated symbols within each TTI of the bundled TTIs respectively comprises:
transmitting modulated symbols corresponding to H/N bits within each TTI, wherein H is the number of bits that can be transmitted by the bundled TTIs, and N is the number of TTIs in a bundle.

6. A device for transmitting bits, which is used for reducing loss of information bits, comprising a processor and a non-transitory processor-readable medium, the processor executing program codes stored in the non-transitory processor-readable medium, which configures the device to:
   determine the number of bits that can be transmitted by bundled transmission time intervals (TTIs), and determining a rate matching output sequence length according to the bits that can be transmitted by the bundled TTIs;
   determine a starting position for bit selection according to a unique redundancy version number, wherein during an initial transmission, the unique redundancy version number used by the second determining module is 0; or, during a retransmission, the unique redundancy version number used by the second determining module is 0, 1, 2 or 3;
   in a buffer for buffering a bit stream after subblock interleaving, start to successively and circularly select bits whose length is the rate matching output sequence length from the starting position for the bit selection, wherein the bit streams the bit stream after the subblock interleaving is a bit stream obtained after performing the subblock interleaving to a codestream that is obtained after performing cyclic redundancy check (CRC) addition, code block segmentation, code block CRC addition and coding to the information bits;

perform code block cascading to rate matching output bits for each code block;

perform modulation to the code block-cascaded bits, and transmit modulated symbols within each TTI of the bundled TTIs respectively.

7. The device according to claim 6, wherein, the device is specifically configured to determine the bits that can be transmitted by the bundled TTIs according to a following computation formula:

$$H=G \times N, \text{ wherein,}$$

H is the number of bits that can be transmitted by the bundled TTIs;

G is the total number of bits available for transmission of a transport block within a TTI;

N is the number of TTIs in a bundle.

8. The device according to claim 6, wherein, the device is specifically configured to determine the rate matching output sequence length according to a following computation formula:

$$\text{if } r \leq C-\gamma-1, \text{ then } E_r' = N_L \times Q_m \times \lfloor G'/C \rfloor, \text{ otherwise,}$$
$$E_r' = N_L \times Q_m \times \lceil G'/C \rceil;$$

wherein $E_r'$ is the rate matching output sequence length;

r is a code block number; C is the number of code blocks obtained during code block segmentation; $\lfloor \ \rfloor$ indicates rounding down, $\lceil \ \rceil$ indicates rounding up;

$\gamma = G'$ mod C, wherein the mod indicates modulo operation;

$G' = H/(N_L \times Q_m)$, wherein H is the number of bits that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

9. The device according to claim 6, wherein the device is specifically configured to determine the starting position for the bit selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2 \right)$$

wherein, $k_0$ is the starting position;

$R_{subblock}^{TC}$ is the number of rows of a matrix used during the subblock interleaving;

$N_{cb}$ is a size of the buffer for buffering the bit stream after the subblock interleaving;

$rv_{idx}$ is the unique redundancy version number.

10. The device according to claim 6, wherein the device is specifically configured to transmit modulated symbols corresponding to H/N bits within each TTI, wherein H is the number of bits that can be transmitted by the bundled TTIs, and N is the number of TTIs in a bundle.

11. A user equipment, which is used for reducing loss of information bits, comprising:

a memory, configured to store a bit stream after subblock interleaving;

a processor, configured to determine the number of bits that can be transmitted within bundled transmission time intervals (TTIs); determine a rate matching output sequence length according to the number of the bits that can be transmitted by the bundled TTIs; determine a starting position for bit selection according to a unique redundancy version number, wherein during an initial transmission, the unique redundancy version number used by the second determining module is 0; or, during a retransmission, the unique redundancy version number used by the second determining module is 0, 1, 2 or 3; in the memory, start to successively and circularly select bits whose length is the rate matching output sequence length from the starting position for the bit selection, wherein the bit streams the bit stream after the subblock interleaving is a bit stream obtained after performing the subblock interleaving to a codestream that is obtained after performing cyclic redundancy check (CRC) addition, code block segmentation, code block CRC addition and coding to the information bits, and obtain rate matching output bits for each code block; perform code block cascading to the rate matching output bits for each code block; and perform modulation to the code block-cascaded bits;

a transmitter, configured to transmit modulated symbols within each TTI in the bundled TTIs respectively.

12. The UE according to claim 11, wherein during an initial transmission, the unique redundancy version number used by the processor is 0; or, during a retransmission, the unique redundancy version number used by the processor is 0, 1, 2 or 3.

13. The UE according to claim 11, wherein, the processor is specifically configured to determine the number of the bits that can be transmitted by the bundled TTIs according to a following computation formula:

$$H = G \times N, \text{ wherein,}$$

H is the number of bits that can be transmitted by the bundled TTIs;

G is the total number of bits available for transmission of a transport block within a TTI;

N is the number of TTIs in a bundle.

14. The UE according to claim 11, wherein the processor is specifically configured to determine the rate matching output sequence length according to a following computation formula:

$$\text{if } r \leq C-\gamma-1, \text{ then } E_r' = N_L \times Q_m \times \lfloor G'/C \rfloor, \text{ otherwise,}$$
$$E_r' = N_L \times Q_m \times \lceil G'/C \rceil;$$

wherein, $E_r'$ is the rate matching output sequence length;

r is a code block number; C is the number of code blocks obtained during the code block segmentation; $\lfloor \ \rfloor$ indicates rounding down, $\lceil \ \rceil$ indicates rounding up;

$\gamma = G'$ mod C, wherein the mod indicates modulo operation;

$G' = H/(N_L \times Q_m)$, wherein H is the number of bits that can be transmitted by the bundled TTIs;

for transmission diversity, $N_L = 2$, otherwise, $N_L$ is equal to the number of layers a transport block is mapped onto;

$Q_m$ is a value corresponding to the modulation mode.

15. The UE according to claim 11, wherein the processor is specifically configured to determine the starting position for the bit selection according to a following computation formula:

$$k_0 = R_{subblock}^{TC} \times \left(2 \times \left\lceil \frac{N_{cb}}{8 R_{subblock}^{TC}} \right\rceil \times rv_{idx} + 2 \right)$$

wherein, $k_0$ is the starting position;

$R_{subblock}^{TC}$ is the number of rows of a matrix used during the subblock interleaving;

$N_{cb}$ is a size of a buffer for buffering the bit stream after the subblock interleaving;

$rv_{idx}$ is the unique redundancy version number.

16. The UE according to claim 11, wherein the transmitter is specifically configured to: transmit modulated symbols corresponding to H/N bits within each TTI, H is the number of bits that can be transmitted by the bundled TTIs, and N is the number of TTIs in a bundle.

17. A method for receiving bits, which is used for reducing loss of information bits, comprising:

receiving modulated symbols transmitted by bundled TTIs, wherein the modulated symbols is obtained by: determining the number of bits that can be transmitted by bundled transmission time intervals, TTIs, and determining a rate matching output sequence length according to the number of the bits that can be transmitted by the bundled TTIs; determining a starting position for bit selection according to a unique redundancy version number, wherein during an initial transmission, the unique redundancy version number used by the second determining module is 0, or, during a retransmission, the unique redundancy version number used by the second determining module is 0, 1, 2 or 3; in a buffer for buffering a bit stream after subblock interleaving, starting to select bits whose length is the rate matching output sequence length from the starting position for the bit selection successively and circularly, obtaining the rate matching output bits for each code block, wherein the bit stream after the subblock interleaving is a bit stream obtained after performing the subblock interleaving to a codestream that is obtained after performing cyclic redundancy check (CRC) addition, code block segmentation, code block CRC addition and coding to the information bits; performing code block cascading to the rate matching output bits for each code block; and performing modulation to the code block-cascaded bits, and transmitting modulated symbols within each TTI of the bundled TTIs respectively;

processing the modulated symbols according to the unique redundancy version number.

18. A base station, which is used for reducing loss of information bits, comprising:

a receiver, configured to receive modulated symbols transmitted by bundled TTIs and send the modulated symbols to a processor, wherein the modulated symbols is obtained by: determining the number of bits that can be transmitted by bundled transmission time intervals, TTIs, and determining a rate matching output sequence length according to the number of the bits that can be transmitted by the bundled TTIs; determining a starting position for bit selection according to a unique redundancy version number, wherein during an initial transmission, the unique redundancy version number used by the second determining module is 0, or, during a retransmission, the unique redundancy version number used by the second determining module is 0, 1, 2 or 3; in a buffer for buffering a bit stream after subblock interleaving, starting to select bits whose length is the rate matching output sequence length from the starting position for the bit selection successively and circularly, obtaining the rate matching output bits for each code block, wherein the bit stream after the subblock interleaving is a bit stream obtained after performing the subblock interleaving to a codestream that is obtained after performing cyclic redundancy check (CRC) addition, code block segmentation, code block CRC addition and coding to the information bits; performing code block cascading to the rate matching output bits for each code block; and performing modulation to the code block-cascaded bits, and transmitting modulated symbols within each TTI of the bundled TTIs respectively;

the processor, configured to process the modulated symbols according to the unique redundancy version number.

* * * * *